United States Patent [19]

Brinkman

[11] 4,210,116
[45] Jul. 1, 1980

[54] ELECTROMAGNETICALLY ACTUATED PUMPS

[75] Inventor: Willem Brinkman, Velp, Netherlands

[73] Assignee: Holec N.V., Hengelo, Netherlands

[21] Appl. No.: 766,549

[22] Filed: Feb. 7, 1977

Related U.S. Application Data

[60] Division of Ser. No. 560,771, Mar. 21, 1975, Pat. No. 4,022,174, and Ser. No. 416,852, Nov. 19, 1973, Pat. No. 4,044,745, and a continuation-in-part of Ser. No. 452,549, Mar. 19, 1974, Pat. No. 3,994,272, and Ser. No. 452,619, Mar. 19, 1974, Pat. No. 3,943,892.

[30] Foreign Application Priority Data

| Mar. 22, 1974 [NL] | Netherlands | 7403913 |
| Mar. 22, 1974 [NL] | Netherlands | 7403914 |
| Mar. 22, 1974 [NL] | Netherlands | 7403915 |
| Mar. 22, 1974 [NL] | Netherlands | 7403916 |
| Mar. 22, 1974 [NL] | Netherlands | 7403917 |
| Mar. 22, 1974 [NL] | Netherlands | 7403918 |
| Jul. 11, 1974 [NL] | Netherlands | 7409428 |
| Aug. 13, 1974 [NL] | Netherlands | 7410855 |

[51] Int. Cl.² .......................................... F02M 51/04
[52] U.S. Cl. .................................. 123/504; 123/497; 417/418

[58] Field of Search ... 123/32 AE, 139 AC, 139 AD, 123/139E; 417/410, 413, 415, 418, 534; 92/13, 13.1, 13.5, 13.51, 13.7

[56] References Cited

U.S. PATENT DOCUMENTS

| Re. 25,934 | 12/1965 | Chausson | 417/418 |
| 1,418,616 | 6/1922 | Boisset | 417/534 |
| 1,721,209 | 7/1929 | Cutler | 123/132 |
| 1,897,044 | 2/1933 | Elwell | 123/139 AC X |
| 2,077,259 | 4/1937 | Planiol | 123/139 E |
| 3,009,628 | 11/1961 | Kolfertz | 417/460 X |
| 3,242,355 | 3/1966 | Davis, Jr. et al. | 417/413 X |
| 3,736,910 | 6/1973 | Raff | 123/139 E X |
| 3,784,334 | 1/1974 | Hilgert | 417/410 X |

FOREIGN PATENT DOCUMENTS

| 519679 | 2/1931 | Fed. Rep. of Germany ... 123/139 AD |
| 765791 | 1/1957 | United Kingdom | 417/418 |

Primary Examiner—Tony M. Argenbright
Attorney, Agent, or Firm—John P. Snyder

[57] ABSTRACT

A pump and pump system employs electromagnetic actuation during discrete, periodic time periods, imparting rapid strokes covering small distances. Each stroke is delineated by stop members at least one of which is of wedge-like form and is controllably shifted to vary the stroke.

42 Claims, 26 Drawing Figures

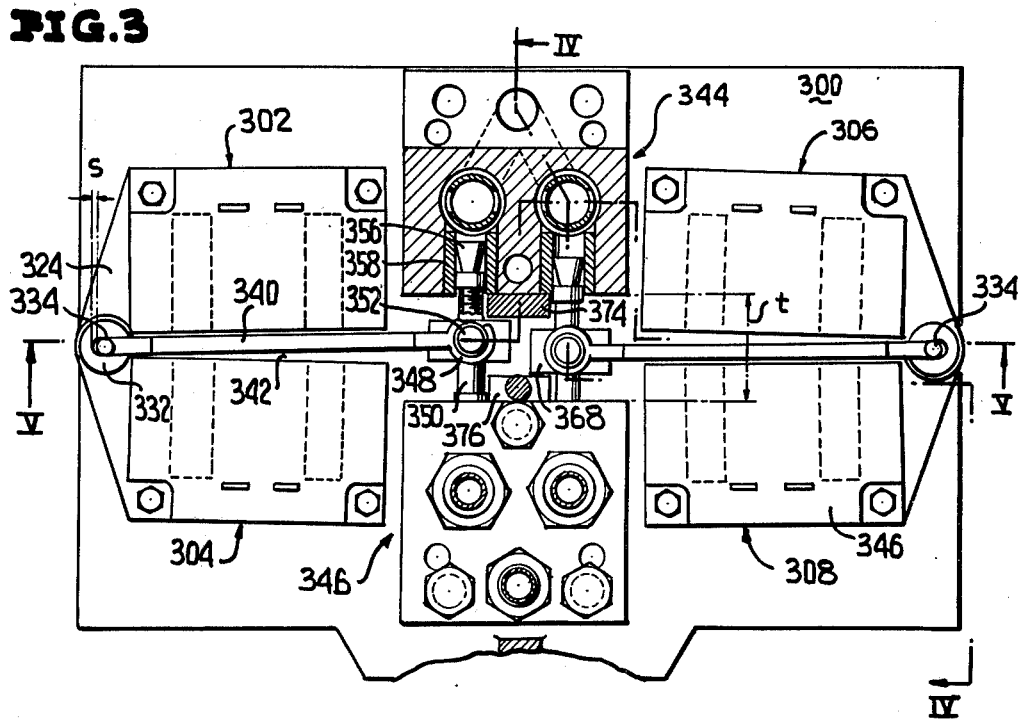
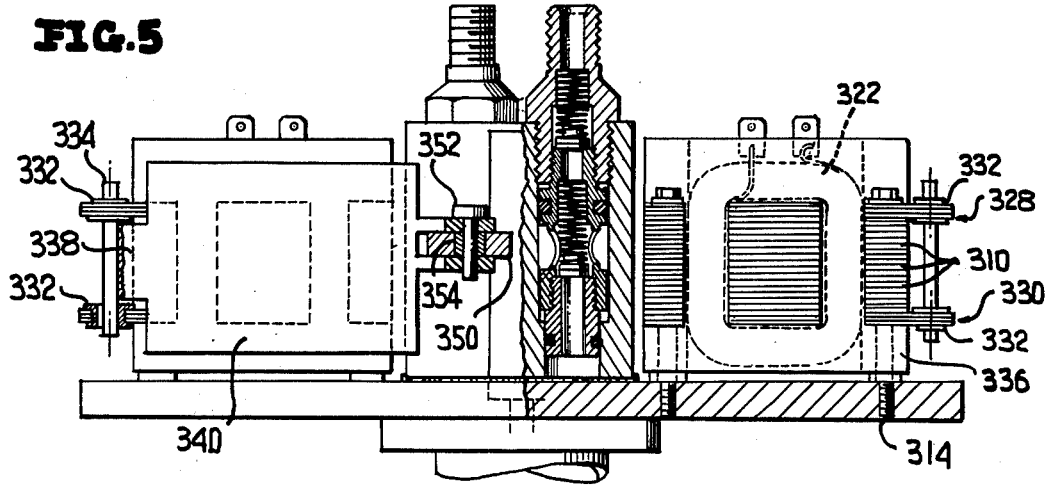
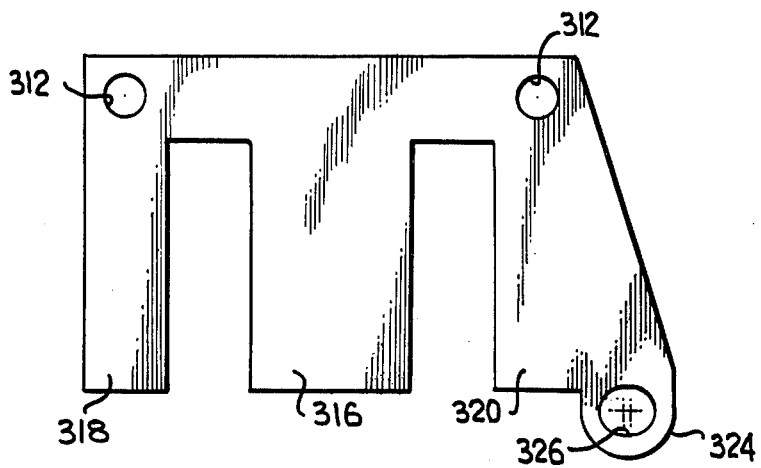

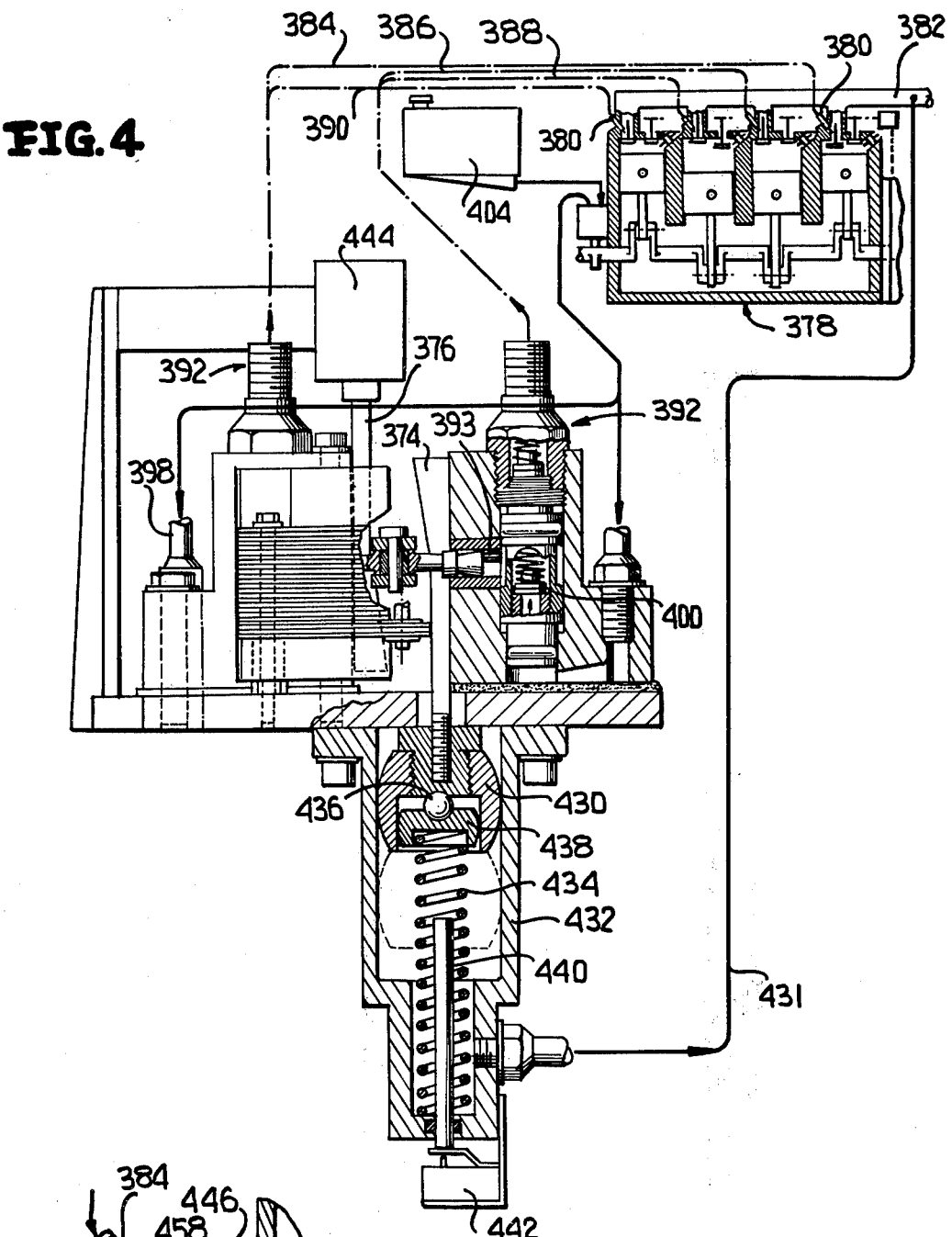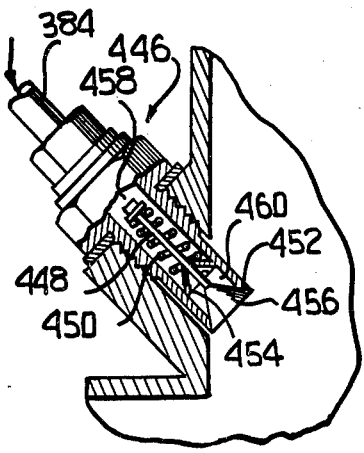

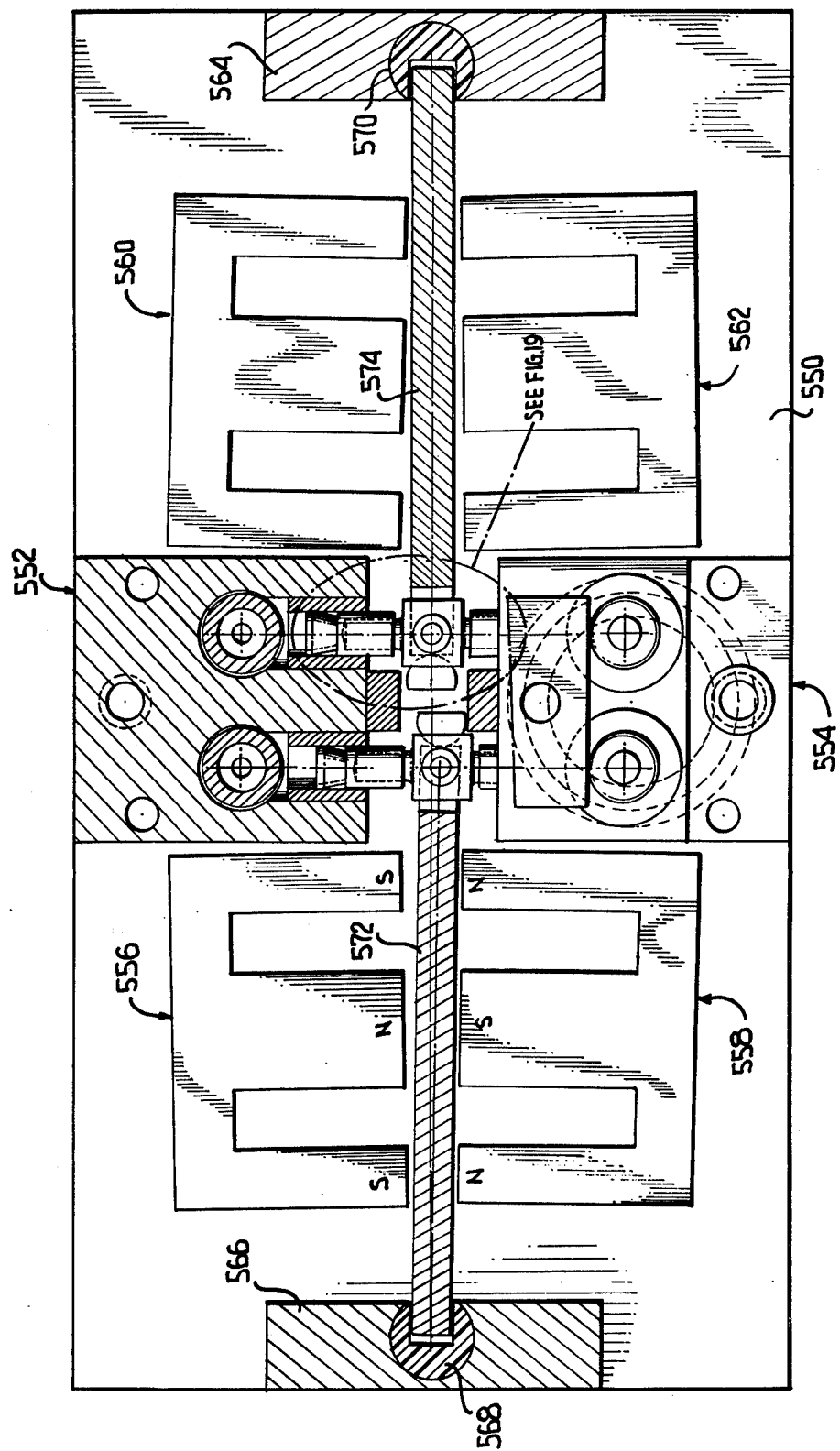

ELECTROMAGNETICALLY ACTUATED PUMPS

CROSS REFERENCE TO RELATED APPLICATION

This is a division of application Ser. No. 560,771 filed Mar. 21, 1975 now U.S. Pat. No. 4,022,174 and copending application Ser. No. 416,852, filed Nov. 19, 1973, now U.S. Pat. No. 4,044,745 through intervening Ser. No. 665,113, assigned in common herewith and is a continuation-in-part of my copending applications Ser. Nos. 452,549 and 452,619 both filed on Mar. 19, 1974, now U.S. Pat. Nos. 3,994,272 and 3,943,892, respectively.

BACKGROUND OF THE INVENTION

This invention relates to pump assemblies and although it is especially useful in connection with fuel injection systems for internal combustion engines of various types it is also directed to new and novel pump systems of more general utility. Pump systems of the prior art have employed electromagnetic drives of various types but associated with each type there are serious disadvantages. Generally speaking, the prior art devices have been of complex nature and require electromagnetic devices for producing the requisite force or energy which are large and massive having regard to the volumetric output produced. Among other things, prior art pump electromagnetic drive devices which are large and massive not only present problems of economy in construction and are wasteful of space and energy but they also do not lend themselves well to high speed operation.

In many instances, the electromagnetic drives have required some type of return spring mechanism, which is fundamentally disadvantageous because the electromagnetic drive must dissipate some of its energy simply in wasteful opposition to the spring means and therefore must be larger and more powerful than otherwise would be the case. Examples of such drives may be found for example in Swiss Pat. No. 349,732, in French Pat. No. 1,108,288 in U.S. Pat. No. 3,380,387 and in German Pat. No. 598,918. Moreover, these devices utilize an armature which moves axially within the electromagnetic winding, inherently involving an inefficient flux field coupling which further augments the need for large electromagnets.

German Pat. No. 598,918 partially overcomes the inherent inefficiency associated with an axially shiftable armature by utilizing, in addition to and in conjunction with an axially shiftable armature, an external disc-like armature means which more efficiently couples the magnetic flux field and, moreover, achieves a characteristic wherein the force exerted on the armature increases during its stroke because the disc-like armature is approaching the electromagnet. However, the disc-like armature serves deleteriously to increase the total mass of the armature assembly, the system employs a return spring which has the disadvantages noted above and, moreover, the system requires the use of a compound piston arrangement to effect the fuel injection function. Further, the German patent requires the secondary piston of the compound piston arrangement to act also as the valve for the injector nozzle. Further, because the arrangement exemplified in devices of the type illustrated in the German patent inextricably combines the pumping and injecting spray functions it requires proximity of the electromagnetic drive mechanism with respect to the combustion cylinder. This is extremely disadvantageous because one cannot avoid excessive engine heat dissipation to the driving assembly and, as well, to the fuel in the pump chamber.

Other types of axial armatures, especially those involving pairs of pistons, as for example as shown in British Pat. No. 464,565, require correspondingly that one electromagnet be associated with each piston of each pair in order somewhat to overcome the inherent inefficiency of the axially located type of armature as noted in this patent. This patent also exemplifies a further prior art deficiency in that such axially reciprocating piston arrangements have been such that a continuous reciprocation is effected. To this end, switching means is coupled with pistion movement so that as soon as a piston reaches one end of its stroke the electromagnets are switched so as immediately to effect the return stroke. The inevitable result of such function is that the end of each pump delivery stroke is transient and therefore ill defined, that is to say, there is no time for the system to "settle" at the end of the delivery stroke. Particularly in systems where the pump operates at high speed, as would be required for a fuel injection system, and liquid delivery is done under high pressure over lines of appreciable length, the transient nature of the end of the stroke cycle will create substantial problems due to the dynamic forces acting on the fuel downstream of the pump. It is a practical impossibility to eliminate these dynamic problems by the use of check valves even though such check valves may have relatively rapid response both in opening and closing.

Generally speaking, the requirements for fuel injection systems are rather stringent, particularly if one is to achieve not only smooth engine response and fuel economy but also if one is to obtain emission characteristics which are acceptable by present day standards. It is essential that each charge delivered by the pump and as discharged at the injector be precise under all operating conditions of engine speed and load and that, as well, the pump discharge characteristics be such that the atomization achieved by the nozzle is effective to produce the proper spray pattern with consequent good ignitability and combustibility of the fuel/air mixture. With regard to these requirements, an axial type armature is inherently incapable of achieving same and even though arrangements such as in the German Pat. No. 598,918 partially overcome certain of the deficiencies of the prior art, there still is lacking complete compliance with all of the requirements which are essential to achieve an effective, efficient and non-polluting fuel injection system.

The above mentioned copending application Ser. No. 416,852 discloses a fuel injection system for internal combustion engines which represents substantial improvement over the prior art. In the copending application, the basic arrangement of a plate-like armature pivoted from one end and connected at its other end to a yoke carrying two pistons is shown. Between the pivot point and the connection to the yoke a pair of electromagnets are arranged on opposite sides of the armature, which electromagnets are energized alternately by means of monostable multivibrators. Because the electromagnets are located between the pivot point and the connection to the yoke, the gap between the electromagnets may be made very small while still achieving the requisite stroke of the pistons carried by the yoke. The fact that the armature is essentially perpendicular to the axes of the coils of the electromagnets produces the result that excellent magnetic flux field coupling is achieved with a minimum of armature mass. In consequence, taken in conjunction with the very small gap between the electromagents, each stroke of the armature is extremely rapid even when the electromagnets are small and compact and have relatively small inductance. The fact that the armature moves toward the electromagnet driving it results in an increasing force exerted on the liquid displacing element during its working stroke. Because of this and of the fact that each pump stroke is effected over a uniformly short time period regardless of engine speed, the spray pattern produced by the fuel atomizing nozzle is of improved form at all times. Said copending application, then, discloses the basic arrangement of a free-floating armature which is shuttled back and forth by electromagnetic means which are energized by pulse generator means, in combination with stop means which interrupt and delineate the end points of the movements of the pistons. The period of each injection cycle is totally independent of engine RPM allowing good ignition and combustion of stoichiometric fuel/air mixtures even at engine idling speed, which results in low CO emission. Further, the capability for remote location mounting assures that low charge temperature is inherent at the start of combustion which results in low $NO_x$ emission.

BRIEF SUMMARY OF THE INVENTION

The present invention is directed to improvements over the fuel injection system discosed in said copending application and, as well, to improvements in pump systems in general which require accurate and precise control.

A basic arrangement according to the present invention involves a pair of cylinder blocks arranged in spaced relation and having mutually opposed and aligned cylinders. A short member bridging between the cylinder blocks and having pistons at its opposite ends received in the respective cylinders is connected to one end of a plate-like armature, the other end of which is fulcrumed to allow the armature to shuttle back and forth to drive the pistons. A pair of generally mutually opposed electromagnets are disposed on opposite sides of the armature and thus shuttle the armature back and forth when alternately energized. Spaced stop means delineate the end points of the shuttling motions of the armature. Because of this arrangement, the mass and consequent inertia of the armature plus the pistons and member carrying them may be made so small that the system can be coordinated as to its electrical and mechanical characteristics such that a number of advantages accrue therefrom. For example, one can employ very short duration energizing pulses which allows very high speed operation (i.e. 6000 RPM or higher in a fuel injection system) while attaining such a small working stroke period as is very much less than the energizing period, in turn allowing the working stroke to be "buried" within the energizing period to effect increased precision of pumping volume, and the very low inertia and relatively small electromagnetic forces involved permit the use of low energy, and consequently very sensitive control devices to be employed for positioning either or both of the stop means correspondingly to vary the working strokes.

The present invention is characterized by the fact that an arrangement is provided wherein the movement of a liquid displacing member is arrested during its working stroke, well before that time at which the electrical energizing force is terminated. The result is that the displacing member reaches its end-of-stroke position at a finite time prior to termination of the electromagnetic energizing current. In other words, the liquid displacing member is free-floating and is urged toward its end-of-stroke position by means of an externally generated electromagnetic force during a time period which is much greater than the time period required for the displacing member to reach such position. Moreover, the time duration of the energizing current and the electromagnetic force acting on the armature system are coordinated with the mechanical characteristics of the system such that the time period of the working stroke is small with respect to the time period of the exciting current and is buried within it. The swept volume executed by the displacing member may therefore be very accurately controlled. To this end, stop means are provided positively to delineate both the beginning-of-stroke and the end-of-stroke position, at least one of such stop means being positionally adjustable so as correspondingly to alter or vary the total stroke of the liquid displacing member.

The return stroke of the displacing member likewise is effected through the medium of an externally generated electromagnetic force which, again, is effective over a time period much greater than that required for the displacing member to reach its return position. In this way, the induction effect created by the displacing member is also very accurate and precise.

As well, this basic arrangement allows two liquid displacing members to be paired for common actuation, so that the electromagnetic force which causes one member to effect its working stroke simultaneously causes the other member to effect its return stroke, and vice versa. The result is an extremely compact and efficient assembly which is capable of very high speed operation.

One embodiment of the invention involves the use of a pair of electromagnets which are in spaced opposition and are energized alternately. Between these electromagnets a flapper type armature is arranged, specifically an armature of plate-like form pivotally located at one end and connected at its other end to a piston. The energizing circuit for the electromagnets includes a pulse generator having an output train of pulses each of substantially the same time duration which is much greater than that time required for the piston to execute its stroke. The system is such that the armature executes each of its strokes some time during the intermediate portion of the time period of the exciting current. Stop means are provided to delineate the end points of piston stroke and are effective to arrest the travel of the piston in its movements as it is being acted upon by the electromagnetic drive, as aforesaid. Although at least one of the stop means is adjustable so as to increase or decrease the stroke of the piston in order to vary the volume ejected per working stroke of the piston, the time period of the working stroke of the piston is always of a value much less than said time duration of an output pulse. Variation of the frequency of the pulse generator output pulses is effective alone to increase the volumetric output rate of the pump whereby the volumetric rate can be altered either by variation in the frequency of the output pulses or by variation of the piston stroke, or both.

In fuel injection systems, the above considerations give rise to the result that control of the output pulse frequency as a function of RPM of the internal combustion engine assures that the engine will receive fuel at a rate coordinated with its output speed, whereas positional variation of the stop means as a function of engine power output will assure that the engine receives an amount of fuel per stroke of the pump commensurate with the power output of the engine. This is most easily seen in conjunction with a conventional piston engine wherein the pump is actuated once for each power stroke of the engine. Thus, as the engine RPM varies, so must the frequency of actuation of the pump vary. Likewise, as the power output of the engine varies, so must the pump stroke vary. In a particular embodiment of the invention, the frequency of the output pulses varies directly with engine speed and one of the stop means is positionally adjusted to vary the pump stroke directly with respect to the value of inlet manifold pressure, i.e., the higher the manifold pressure the greater the pump stroke and vice versa. The advantages of the present system are in fact so great that it is possible completely to terminate operation of the pump when manifold pressure reaches a predetermined low value (i.e. engine load indicative of coasting) without the operator being able to detect when operation of the pump cuts in or out. The factors which principally contribute to this smooth cut-out and cut-in ability and, as well, to the practicality of controlling the pump stroke solely by manifold vacuum variations, are the control of the relative times of the pump stroke and energizing current and the fact that the pump herein has an extremely low response time because of the very low inertia of the moving parts. Very little force is thus required to adjust the controlled stop means and to hold it in adjusted position. Therefore, a sensitive control input member may be used to adjust and hold the stop means, thereby allowing vary rapid and precise control of pump stroke. The response time is so low in fact that in the above noted fuel injection system the response on the average over the engine speed range is about one engine revolution.

As well, the low energy requirement of the control devices and consequent rapid response time allows accurate calibration of fuel delivery at a large number of points within the operating speed and load ranges of the engine, thereby assuring extremely accurate injections over the entire ranges involved, again contributing to low emission characteristics. Extremely smooth operation of the engine results and even when the pump operation is cut out, the manifold vacuum-controlled stop means "follows" the engine output and thus has adjusted the pump stroke to the proper value when the pump again cuts in. Further, the fact that each displacing stroke is of very short duration and is independent of engine speed achieves the result that the liquid displacing member normally is permitted a relatively long period of rest at the end of each working stroke. This factor inherently allows the system to achieve accurately controllable volumes of fuel discharge, i.e., the system is permitted time to "settle" at the end of each working stroke.

The very low inertia characteristics of the pump according to this invention which allows it to operate up to very high speeds, coupled with the fact that an accurately predictable amount of liquid is displaced per pump stroke permits the volumetric rate of liquid delivered by the pump to be controlled by as many as three separate control inputs, i.e. the pump stroke may be varied by either or both of the stop means and the pump frequency may be controlled by varying the frequency of the driving output pulses. Thus, the pump according to this invention is extremely useful for many different applications other than fuel injection as, for example, in metering an additive liquid into a supply liquid. In this example the frequency of pump operation may be controlled in dependence upon volumetric flow of the supply liquid whereas either or both stop means for delineating the pump stroke may be controlled in dependence upon downstream measurement of concentration of the additive liquid. The net result is a system where the concentration of additive liquid is very accurately controlled with a minimum of "hunting," the sensitivity and response time of the present invention being excellent as already noted.

The system herein provides three different potential control inputs, each of which is capable of independently controlling the volumetric output. Either or both stop means may be positionally controlled to vary pump stroke and the frequency of electromagnetic drive energization may also be varied. In a fuel injection system where the frequency of energization is directly proportional to engine speed during normal operation of the engine, the frequency of energization may conveniently be doubled for the purpose of selectively and transiently providing a fuel-rich mixture as, for example, when first starting the engine under low ambient temperature conditions.

BRIEF DESCRIPTION OF THE DRAWING FIGURES

FIG. 1 is a schematic view illustrating certain principles of the invention;

FIGS. 1a, 1b, and 1c show certain waveforms germane to the invention;

FIGS. 3–5 illustrate an embodiment of the invention;

FIG. 7 is a detail of an injector nozzle;

FIG. 9 is a plan view of a frame lamination of the embodiment of FIGS. 3–5;

FIG. 18 is a simplified section showing certain preferred structural details;

DETAILED DESCRIPTION OF THE INVENTION

Figure 1:
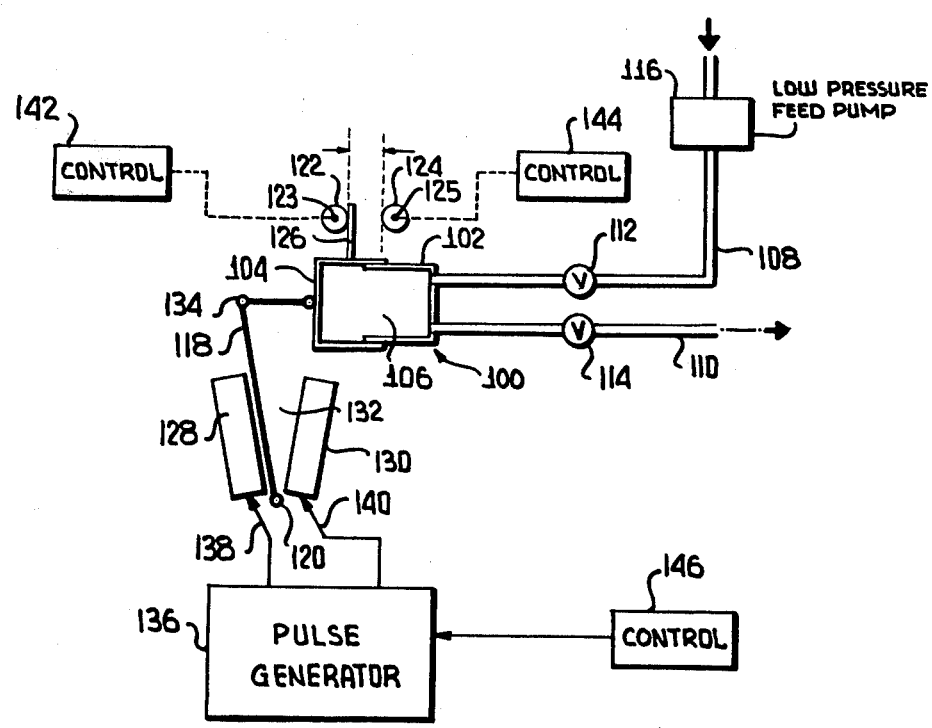

Referring to FIG. 1, certain principles of the present invention will appear from the schematic representation therein. The basic system illustrated in FIG. 1 includes a pump assembly 100 which comprises a fixed body 102 and a liquid displacing member 104 which define a pump chamber 106 having a liquid supply conduit 108 leading thereto and a liquid discharge conduit 110 leading therefrom. These conduits include one-way valves 112 and 114 respectively to assure unidirectional flow of liquid to and from the pump chamber. As will appear more clearly hereinafter, the pump herein operates very rapidly and in order to decrease the energy necessary to operate the pump and also to assure positive filling of the pump chamber 106 when the liquid supply is located remote from the pump, a low pressure supply pump 116 is utilized as shown.

The liquid displacing or movable member 104 is connected to an armature 118 which is fulcrumed at the point 120 so as to be free to flap back and forth between the limits defined by the two stop means 122 and 124 between which the stop pin 126 moves as the liquid displacing member is shuttled back and forth by the armature 118. The armature is actuated by an electromagnetic drive means which includes the two electromagnets 128 and 130 which, as shown, are mounted in opposing relation to define a narrow, slightly divergent corridor 132 therebetween which leads from the region of the fulcrum point 120 to the region of the connecting point 134 between the armature 118 and the displacing member assembly. The electromagnets include windings whose axes are essentially normal to the armature 118 so as to maximize the magnetic flux coupling between each electromagnet and the armature. For this purpose also, the armature is of plate-like configuration and operates essentially as a free-flapping hinge plate.

Figure 1A:
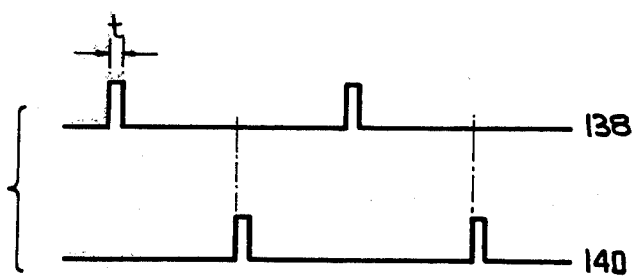

The electromagnetic drive means also includes the pulse generating means 136 which has pulse train outputs at the conductors 138 and 140 which are time-interdigitated as illustrated in FIG. 1a. FIG. 1a also illustrates the fact that the output pulses to each electromagnet 128 and 130 are of predetermined time durations t and it is a feature of the system shown in FIG. 1 that these time durations do not vary with the frequency at which these pulses occur.

Figure 1B:
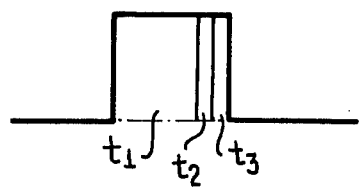

FIG. 1b on the other hand illustrates a single energizing pulse and the time relationship of the pump working stroke with respect to it. The working stroke is executed during the time period $t_2$ which will be seen both to be much shorter than the energization time period t and to be "buried" within it, i.e., the time period $t_2$ occurs before the end of the time period t. As a typical example, the time period t may be of the order of ten milliseconds whereas the time period $t_2$ may be of the order of two milliseconds, the time periods $t_1$ and $t_3$ being in the general order of seven milliseconds and one milliseconds respectively. It will be appreciated that a number of factors are involved in achieving the relationship generally set forth in FIG. 1b. For example, during the time $t_1$, the electromagnetic flux field is building up to reach a value effective to move the armature, the build-up time and electromagnetic flux field ultimately produced being functions of the electrical characteristics of the winding and of the amplitude of the energizing current whereas the onset of the time period $t_2$ and its duration are functions of the mechanical inertia of the system and of the value of the working stroke. Thus, these factors are balanced or coordinated to achieve the general condition as illustrated in FIG. 1b. To this end, the electromagnetic drives should be of relatively low inductance and the working stroke of the liquid displacing member should be small, i.e., in the order of two or three millimeters and producing a volumetric output per working stroke which is in the order of 40–60 cubic millimeters.

Figure 1C:
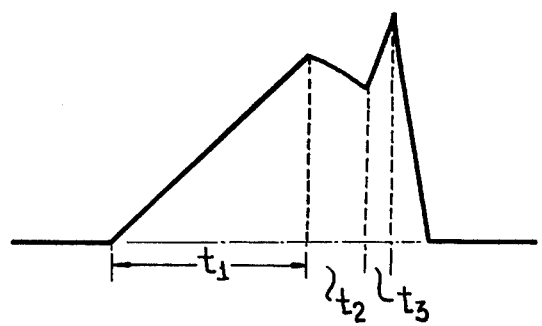

FIG. 1c illustrates a typical current flow through the coil of an electromagnet versus time, the time periods $t_1$, $t_2$ and $t_3$ corresponding to those described in conjunction with FIG. 1b.

Because of the arrangement as described and the inherently low inertia of the moving parts which may be achieved, the forces exerted on the stop means 122, 124 are relatively low. Thus, little energy is required to hold them in position. Moreover, since the engagements with the stops are intermittent, the working stroke of the liquid displacing member may be varied by means of control elements which are of low energy type, correspondingly to allow rapid and precise control. As shown, the stop means 122 and 124 are of eccentric cam type and either or both of them may be rotatably adjusted about their respective eccentric axes 123 and 125 by means of suitable control devices 142 and 144. Each stop means is effective to vary the working stroke of the pump although only one stop means need be used to control the fuel injections necessary under normal operation of the engine, the other stop means being reserved for control such as for starting the engine under low ambient temperature conditions, to compensate for altitude changes, for humidity changes, etc.

In addition to the two control means 142 and 144, an additional control means 146 is provided which is effective similarly to vary the frequencies of the output pulse trains at the conductors 138 and 140. In the specific example given above, the pump means can be operated at speeds up to 50 cycles per second before overlap of the pulses at the input conductors 138 and 140 would occur. However, it is possible to operate the above pump system at greater speeds, in which pulse overlap occurs, because each build-up time $t_1$ represents the greater portion of each pulse. Obviously, too great an overlap will reach a stage at which the two electromagets 128, 130 begin to "fight" each other to such an extent as will detract materially from the efficiency of the system, and such degree of overlap is to be avoided.

The above example clearly illustrates the potentially large range of volumetric flow which may be effected by the three control means 142, 144 and 146. Further, it will be appreciated that the pump system of the present invention attains substantial advantages by providing the capability for being controlled as to volumetric flow by three separate and distinct control means. Certain examples of systems making use of these plural control points are given hereinafter. However, at this time attention is directed to FIG. 2 which illustrates an important application of this invention, namely as a fuel injection system for internal combustion engines.

Figure 2:
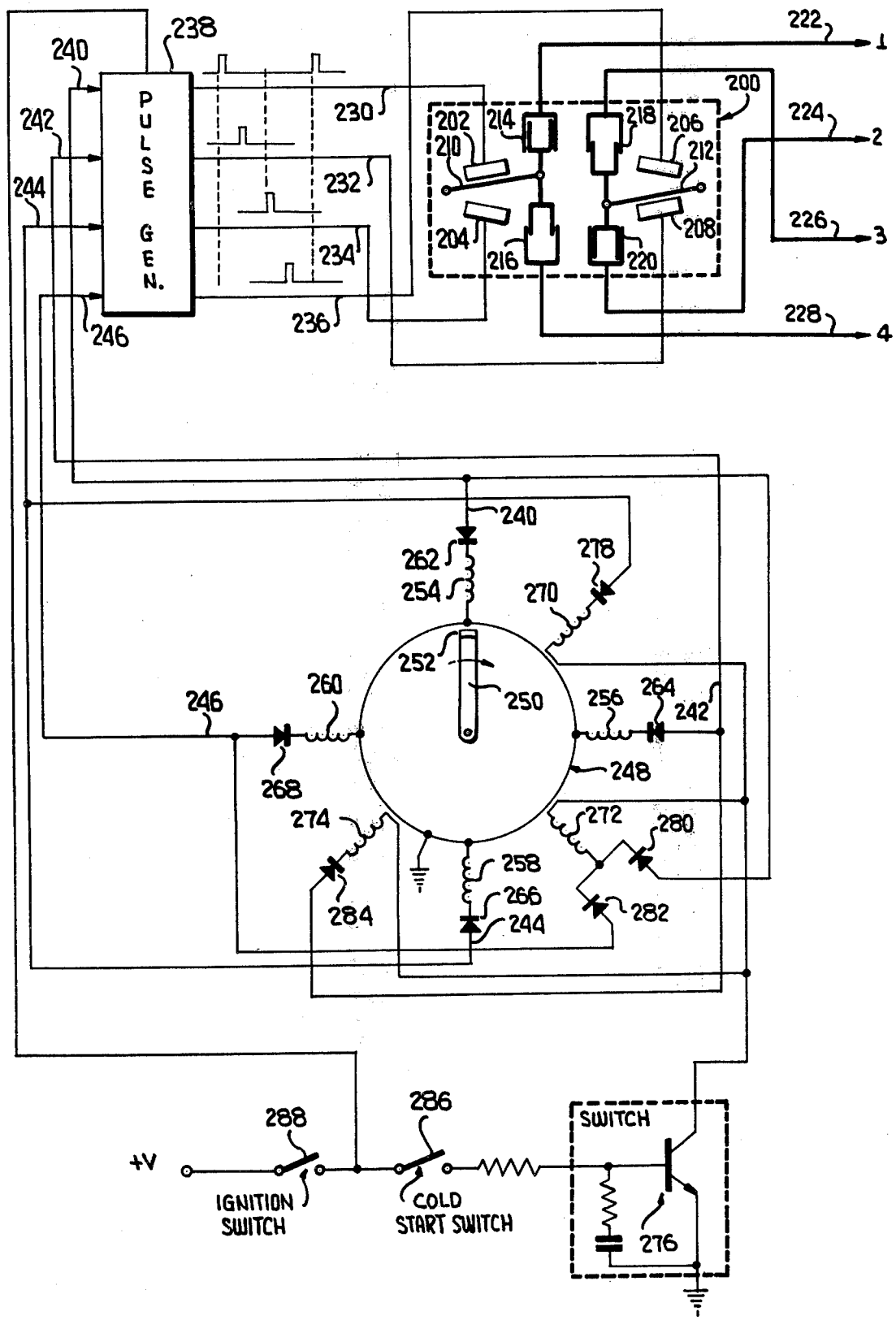
FIG. 2 is a diagramatic view showing further details of the invention.

Although FIG. 2 is largely schematic, it does illustrate certain important and further features of this invention as it relates to fuel injection systems. The system illustrated includes a support 200 upon which four electromagnets 202, 204, 206 and 208 are fixed, each pair of electromagnets being associated with one of the armatures 210 and 212 and, as distinct from FIG. 1, each armature is connected to operate a respective pair of pumps 214, 216 or 218,220. In FIG. 2, the inlet conduits to the various pumps are not shown for purposes of clarity nor are the check values in the outlet conduits 222, 224, 226 and 228 shown, for the same reason. The four outlet lines will be understood to discharge fuel to four injection nozzles associated individually with the cylinders of an in-line four cylinder Otto cycle engine. It will be understood that the normal firing order 1-3-4-2 for this type of engine is employed. Thus, injector operation is over the sequence of fuel delivery lines 222-226-228-224 which, as will be seen, evenly distributes the injection cycles over the four pumps. Thus, the energizing output pulses sequentially appear at the conductors 230, 232, 234 and 236, as illustrated, thereby sequentially to energize the pumps 202, 208, 204 and 206. The output pulses are derived from a suitable pulse generator means 238 which may be a series of four monostable multivibrators individually triggered by timing pulse inputs over the conductors 240, 242, 244 and 246. These triggering pulses are obtained from the distributor mechanism 248 which includes a rotor 250 having a permanent magnet 252 attached to its outer end whereby closely to sweep past the equally circumferentially spaced pickup coils 254, 256, 258 and 260. These pickup coils are grounded to the casing of the mechanism 248 and the current induced therein pass triggering pluses sequentially through the respective diodes 262, 264, 266' and 268. The rotor 250 is of course driven at half engine speed and it will be understood that the distributor mechanism 248 corresponds to the control means 146 of FIG. 1, thereby controlling; the pulse generator means in consonance with engine speed. It will be understood that the usual vacuum and/or centrifugal advance or retard mechanism may be employed to alter the timing of the triggering pulses, as may be desired. It will also be understood that the stop means 122 and 124 of FIG. 1 are employed in conjunction with each of the armatures 210 and 212 so that either or both of such means may be employed to vary the pump strokes according to engine load whereas the other may be employed for cold starting or for altitude or ambient temperature response control, or it may simply remain fixed. FIG. 2 illustrates an embodiment for providing increased fuel injection for cold starting. This sytem involves three further pickup coils 270, 272 and 274 each having one end connected to the emitter-collector path of the transistor 276 which operates as a switch under cold starting conditions. The transistor normally is off so that no induced trigger pulses can pass the diodes 278, 280, 282 and 284 which sequentially connect to the conductors 244, 240 and 246 and 242. When the switch formed by the transistor 276 is on, each cylinder associated with the outlet lines 222, 224 226 and 228 receives twice as many injections as it normally would without upsetting the normal sequencing of the armatures 210 and 212 as is required for the normal sequencing of the pumps 214, 218, 216 and 220.

The transistor switch may be turned on through the switch 286 when the ignition switch 288 is closed. The switch 286 may be a manual switch, it may be an automatic switch operated for example by engine coolant temperature, or it may be of any other form as desired.

With reference to FIGS. 3 and 5, an embodiment of the invention as disclosed in my copending application Ser. No. 452,549 is shown therein. The pump assembly includes a mounting plate 300 to which four electromagnets 302, 304, 306 and 308 are secured, each of which comprises a core formed from the laminations 310 which, as is shown in FIG. 9, are provided with openings 312 for receiving the anchor bolts 314 which are engaged in the support 300. Each lamination includes a pole portion 316 and legs 318 and 320, the winding 322 of each electromagnet being wound around the core provided by the stacked laminations as shown in FIG. 5. At the top and bottom of each stack of laminations, the particular configuration shown in FIG. 9 is used. In this form of lamination the leg 320 is extended to provide an ear 324 with an opening 326 therein. Several of such laminations are used at the top and at the bottom of the stacks of each electromagnet pair such as the pair 302, 304 and are interdigitated so that, in effect, vertically spaced hinge ears 328 and 330 are formed. The openings through these ears receive elastic bushings 332, preferably made from a superpolyamide, and a pintle pin 334 is received with clearance S (see FIG. 3) in each set of bushings. The winding and laminated core assembly of each electromagnet is potted in a suitable synthetic resin 336 which is shaped of block-like form as shown.

Each pintle 334 is carried at one end 338 of an associated armature 340 which, as will be seen from FIG. 5, is of plate-like configuration of sufficient area as to effect excellent magnetic flux field coupling over the areas of the free ends of the portions 316, 318 and 320 of the laminations. It will be noted that these free end areas of each pair of laminated cores are very closely spaced and that they form a narrow, divergent channel 342 therebetween which leads in each case from the region of the pintle 334 toward the space between the pump bodies 333 and 346.

The opposite end of each armature is provided with a narrow, bifurcated extension which presents the vertically spaced boss portions 348 between which is positioned the cross piece 350 of a liquid displacing assembly. The bosses 348 receive a coupling pin 352 and the cross piece 350 has an opening fitted with an elastic bushing 354, preferably formed from a superpolyamide material, the purpose of which is to provide a cushioning or shock absorbing effect as will presently be apparent. Each cross piece 350 bridges between the two pump bodies 344 and 346 and mounts a liquid displacing member at each of its ends. These members are in the form of cup shaped pistons 356 as will be evident in FIG. 3.

Figure 16:
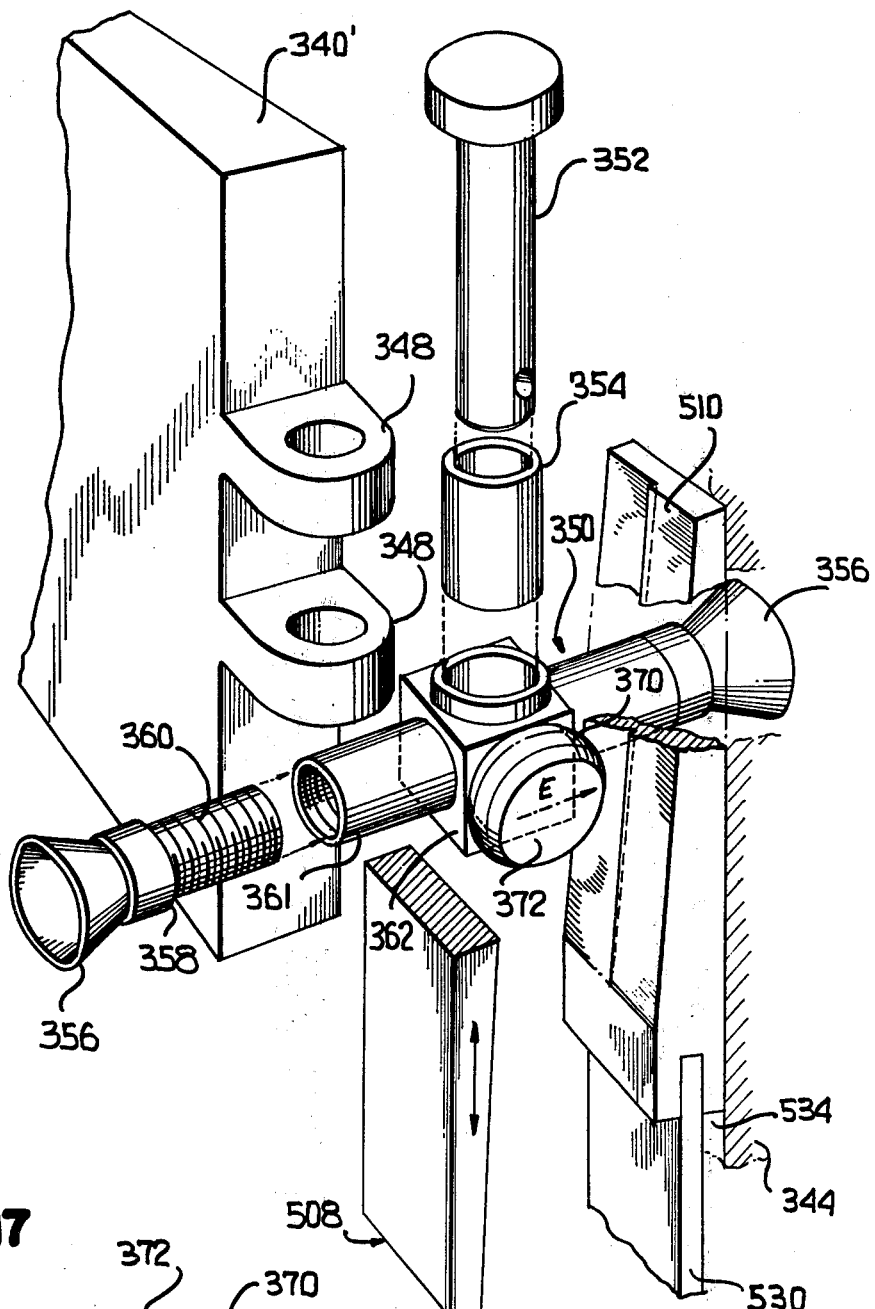
FIG. 16 is an exploded perspective showing a portion of the embodiment of FIG. 11.
Figure 17:
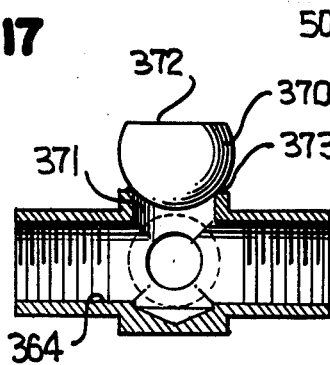
FIG. 17 is a sectional detail of FIG. 16.

Each pump body 344, 346 includes a cylinder defined by a hardened steel liner 358 within which a respective piston 356 is received. A preferred form of cross piece construction and one form of piston is best illustrated in FIG. 16. As shown, the piston 356 includes a guide collar position 358 and a threaded extension 360 and the cross piece 350 includes the central block portion 362 having a vertical bore receiving the bushing 354 and opposite side extensions 366 which are internally threaded (see FIG. 17) to receive the threaded nipples of the pistons. Suitable adhesive is employed permanently to join the pistons to the brass piece 350. Although FIGS. 3 and 5 merely show projecting stop pin portions 368 on the cross pieces, the preferred configuration is illustrated in FIG. 61 wherein the stop member is in the form of a hardened steel ball 370 seated within the bore 371 and resistance-welded thereto along the interface 373 as shown in FIG. 17 and ground off across the face 372 as shown in order to reduce its weight and also to provide clearance between the inner ends of the two armatures.

The opposed inner faces of the pump bodies 344 and 346 provide reaction surfaces against which two wedge shaped and vertically slidable stops means 374 and 376 engage. It is against the surface of these two stop means that the stop pins engage during the working strokes of the pumps. At this point it is well to elucidate certain novel feature which accrue in consequence of the combinational arrangement as described to this point. As noted, the electromagnets of each pair are closely spaced and as a result the armatures are strongly influenced thereby. By arranging the electromagnets between the pivot and displacing ends of the armatures, the close spacing of the electromagnets of each pair still allows sufficient movements of the liquid displacing members to effect the requisite pumping action. For example, in a prototype fuel injection system, having a maximum pump stroke of 2 mm, each pump delivered a maximum of 40 mm$^3$ of fuel per stroke up to a maximum of 85 injections per second. The rapidity with which each pump performs its working stroke is due not only to the narrow spacing between electromagnets of each pair and the excellent magnetic flux coupling achieved by the form and arrangement of the armature, but also to the very low mass of the moving parts. Additionally, the pivoting of the armature at one end tends to minimize inertia. Moreover, the fact that each armature approaches the energized electromagnet as the working stroke progresses assures that the liquid displacing member experiences a progressively increasing motivating force as the end of the working stroke is approached. The result of this is that the fuel injection nozzles, whether injection is indirect into the intake manifold or direct into the combustion chamber, produce spray patterns which maximize the ignitability and combustibility of the fuel. Thus, it is possible even at idle speed to inject stoichiometric amounts of fuel from standard nozzles such as a Lucas 71325 injector nozzle assembly. The precisely accurate control of fuel supplied to the injectors is in large part due to the concept of urging a liquid displacing member in opposite directions during working and return strokes while arresting the displacements or motions of the member while it is still under the influence of motivating force. The end-of-stroke positions are thus very accurately defined and by virtue of small stroke and mass the stop means require very little energy to hold an adjusted position. This in turn allows very precise control of the stop means because sensitive devices may be employed to actuate them. In this regard, the prototype mentioned above required control over only one of the stop means via an inlet manifold-actuated device as hereinafter described while achieving a response time in the order of one engine revolution on the average and with calibration capability such as obtains substantially stoichiometric fuel/air mixtures over the whole engine speed and engine load ranges.

Figure 6:
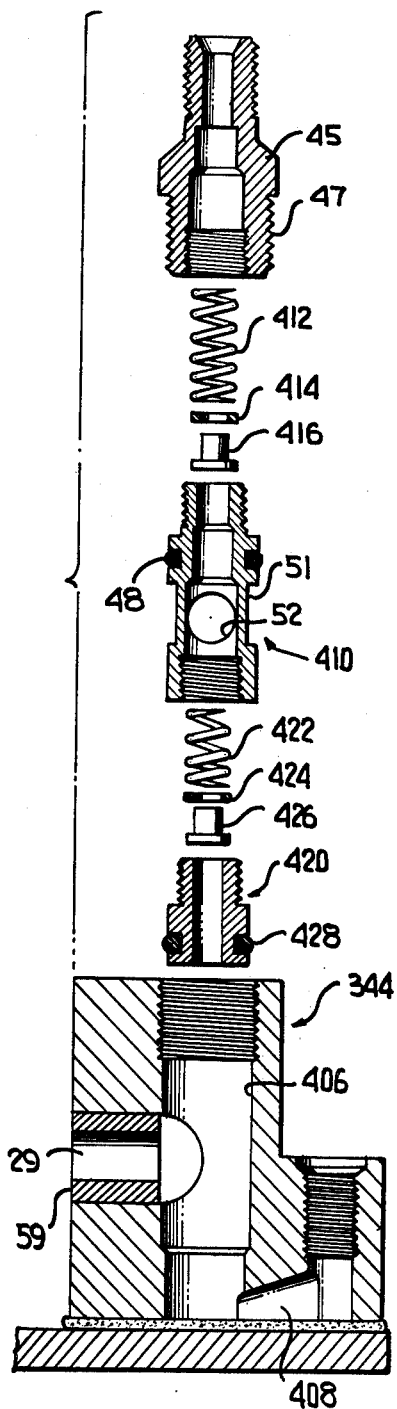
FIG. 6 is an exploded view illustrating certain details of the embodiment of FIGS. 3–5.

Returning to FIG. 4, an indirect injection system is shown in its entirety. The internal combustion engine 378 shown is of the in-line, four cylinder, four stroke cycle type and is provided with injectors 380 spraying into the inlet manifold 382 in close proximity to the respective intake valves. The pump assembly is connected via individual fuel lines 384, 386, 388 and 390 to these injectors, one fuel line being connected to each outlet nipple 392. Each outlet connects an associated pump chamber 393 through an outlet check valve 394 with the respective injector and each pump chamber is connected through one of the two inlet lines 396 and 398 and its associated inlet check valve 400 with a conventional type of low pressure feed pump 402 associated with the engine 378 and connected to the fuel supply tank 404. A preferred type of inlet/outlet connection is shown in FIG. 6. As illustrated the assembly includes a number of easily replaceable component parts disposed in the bore 406 of the associated pump body. Each inlet line leads to a branched conduit supplying two pump chambers through one of a pair of branches 408. The outlet nipple 392 threadedly receives the upper end of a valve seat body 410 and a spring 412 and spring seat 414 normally urge the outlet valve 416 against the seat on the body 410. An annular groove in the body 410 receives an O-ring 418 and seals within the bore above the level of the pump chamber. The lower valve seat body 420 is threadedly engaged in the body 410 and likewise between them are the spring 422, spring seat 424 and inlet valve 426 which seats upon the body 420. The body 420 is provided with the O-ring 428 for sealing below the level of the pump chamber.

As shown in FIG. 4, the stop wedge 324 is axially positioned by means of the barrel-shaped pistion 430 which operates in the vacuum cylinder 432. The piston 430 is subjected on its upper side to ambient pressure and on its lower side through the line 431 to negative pressure in the inlet manifold 382. Normally, the piston 430 is urged to its uppermost position by means of the spring 434 and in order to avoid cocking of the piston 430 which might otherwise cause binding action, the spring 434 engages the piston 430 through the medium of a ball 436 disposed between the piston and the spring seat 438. The spring seat is barrel-shaped and fits within a counterbore of the piston 430, as shown, again to prevent binding especially when manifold vacuum is sufficiently high as to cause the seat 438 to engage the cut-out rod 440. The rod 440 when depressed actuates the microswitch 442 which interrupts electrical power supply to the pump assembly. Cessation of fuel injection may be set to occur when the intake manifold vaccuum exceeds about 23" Hg. Thus, when coasting the fuel injection ceases and the efficiency and accuracy of the system is so great that the transition between cut-out and cut-in, even at very low vehicle speed, is undetectable to the operator or passengers. The system responds so well that with only the manifold vacuum control engine operation and response is extremely smooth even under hard acceleration conditions.

However, the other stop means 376 may also be positionally adjustable under the influence of a control device 444 which may shift the associated wedge in response to changes in atmospheric pressure or temperature, or this control may be used under other conditions such as for cold starting.

FIG. 7 illustrates a typical injector 446 which includes the needle 448 having a valve 456 at one end normally engaging the seat 452 under the influence of the spring 450. The two chambers 458 and 460 are communicated through the passage 454 formed in the web-like seat for the spring 450 and fuel entering the chamber 458 under high pressure due to the pumping action hereinablve described unseats the valve 456 and allows a mist-like burst or spray pattern of fuel to be sprayed by the nozzle. The injector nozzle valve will unseat under the influence of a pressure differential typically in the order of 90 psi whereas the pump which delivers the fuel to the nozzle produces a very rapid pressure rise even after the injector valve has opened. As noted, the working stroke of the pump occupies a very brief interval of time but the actual discharge time of the injector is even more brief. Under ordinary circumstances such a brief period of injector nozzle discharge might well give rise to erratic performance due to variations in amount of fuel delivered from stroke-to-stroke. However, it will be noted that with the system herein the period of the pump working stroke is entirely independent of engine speed and the amount of fuel delivered during each working stroke is very accurately metered. The residual pressure in the feed line, such as the feed line 384 in FIG. 4, as influenced by the corresponding outlet valve at the pump end of the line should not be too great with direct injection systems because of fuel leakage or dribble from the nozzle during the engine piston intake stroke due to the existence of pressure differential across the nozzle valve as will open it. With indirect injection systems which are lower pressure systems in the first place, this problem is not apt to occur. However, with both types of system the presence and characteristics of the pump-end outlet valve are important when, as is often the case, the fuel delivery lines are of unequal lengths. Thus, with a low pressure system, the force exerted by the outlet valve spring 412 should be such as causes a relatively slow-closing (relative to the nozzle valve). In the former case, the quick-acting outlet valve minimally allows bleed-back of fuel past it and into the pump chamber whereby a stabilized maximum quantity of fuel is delivered, whereas in the latter case the outlet valve should be slow enough in its action as to allow sufficient bleed-back into the pump chamber as reduces the residual line pressure to below that valve at which leakage from the nozzle will occur during the engine induction stroke.

Figure 8:
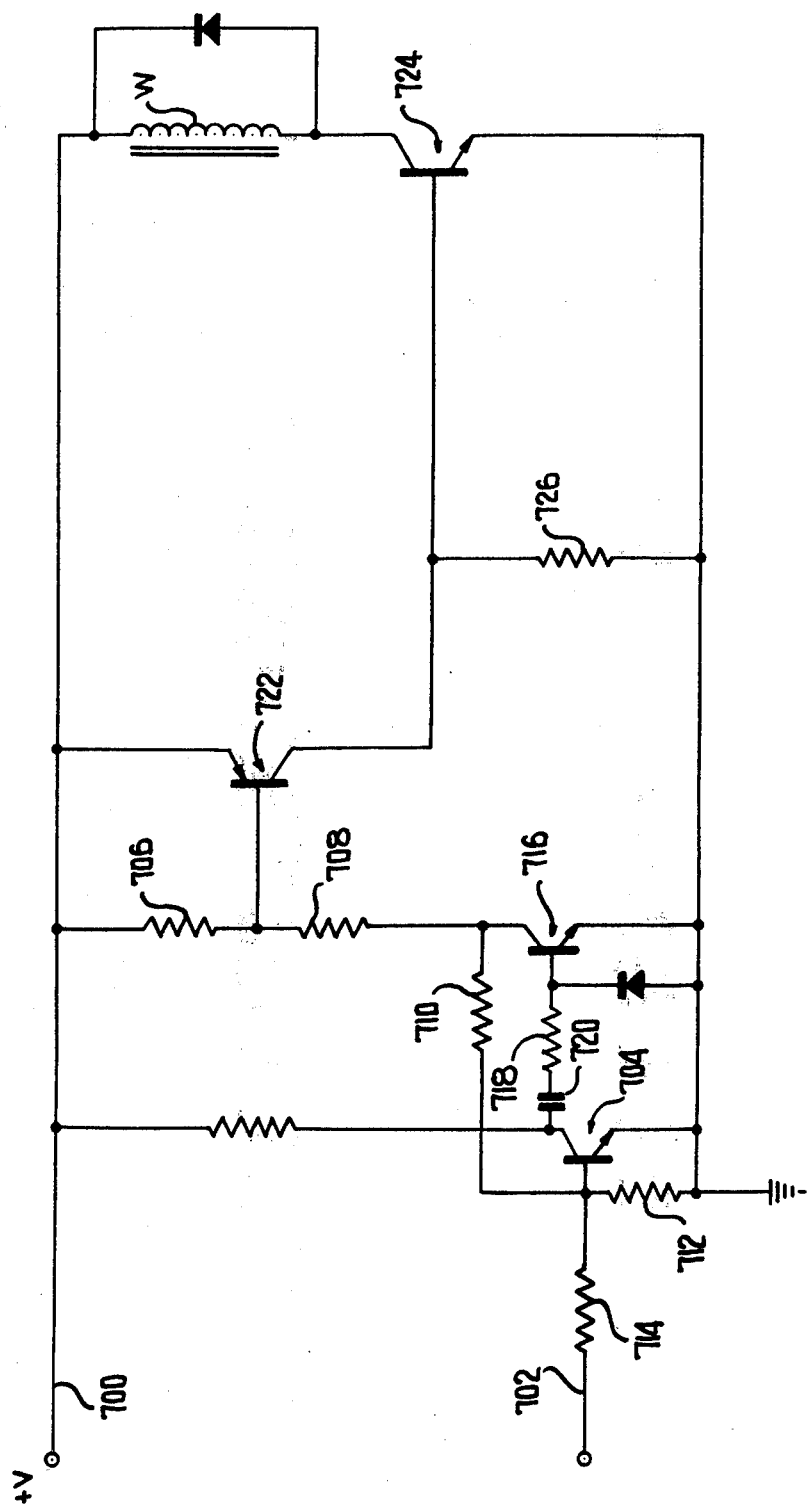
FIG. 8 is a circuit diagram of a preferred form of electromagnet drive.

FIG. 8 illustrates a preferred pulse generator means in the form of a monostable multivibrator of predetermined pulse output duration which turns on a transistor switch to energize the corresponding electromagnet winding, it being appreciated that one such circuit is provided for each separate electromagnet.

Figure 10:
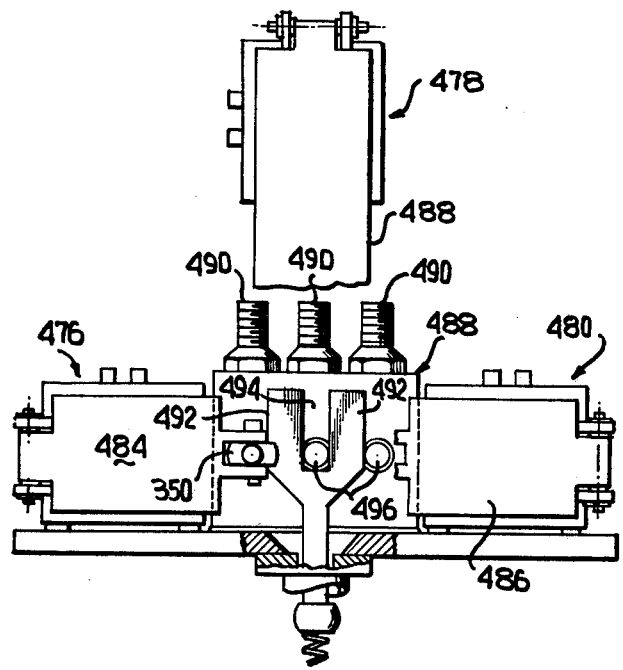
FIG. 10 is a partial view of another embodiment.

FIG. 10 illustrates an arrangement of three pairs of electromagnets 476, 478 and 480 with corresponding armatures 482, 484 and 486. A pair of pump bodies are associated with these armatures, one of which is indicated at 488 and having three fuel outlet nipples 490. One stop means is shown which presents a bifurcated wedge portion 492 defining a recess 494 therebetween which provides clearance for the cross piece 350 associated with the armature 488. The cross pieces associated with the armatures 484 and 486 strike the respective two legs 492 and the cross piece associated with the armature 488 strike either one or both of them. This arrangement accommodates for a six cylinder engine.

Figure 11:
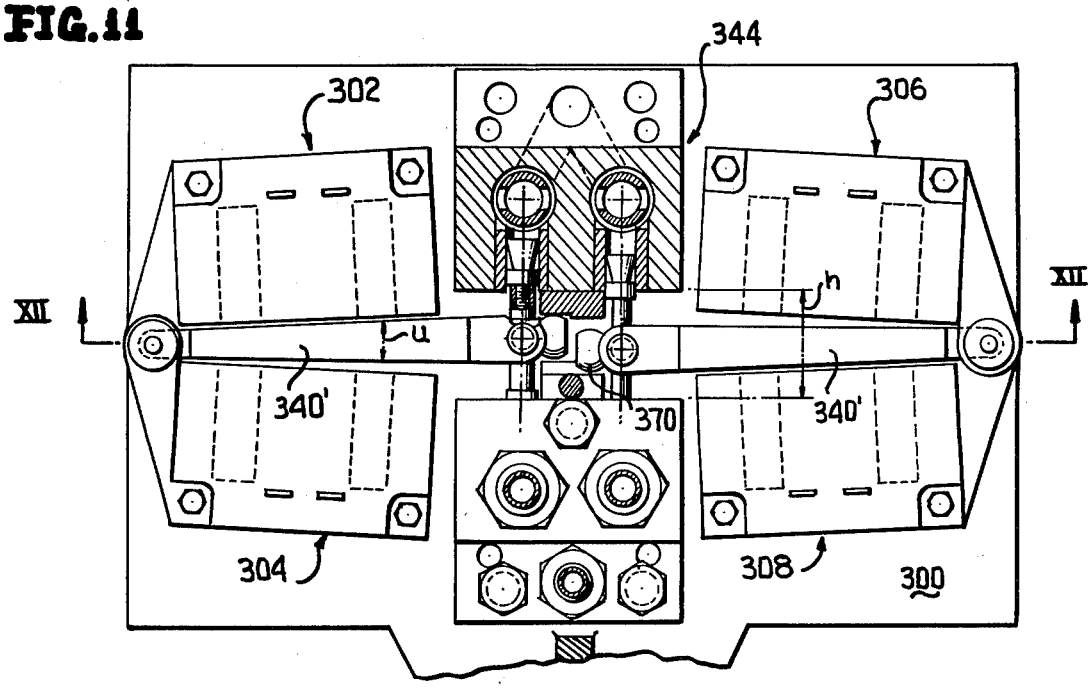
FIG. 11 is a plan view of a further embodiment.
Figure 12:
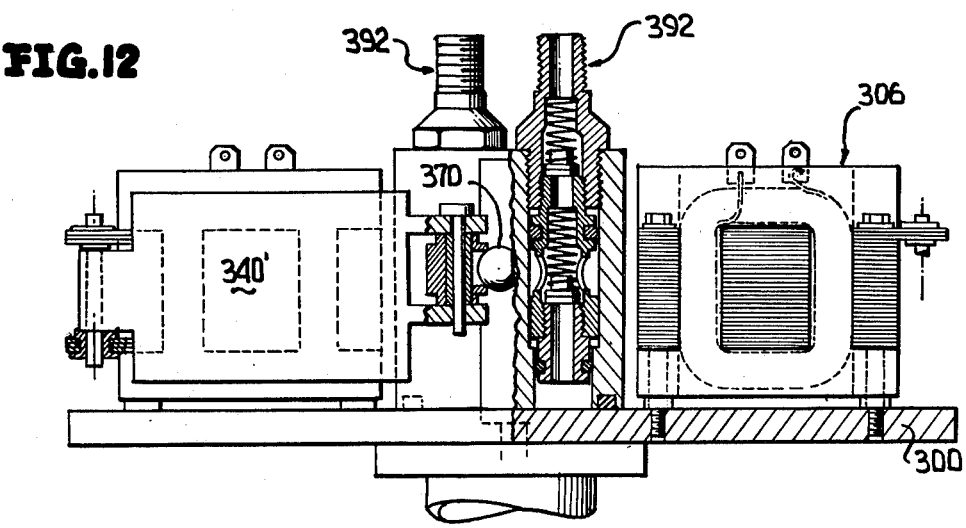
FIG. 12 is a section taken along line XII—XII in FIG. 11.
Figure 13:
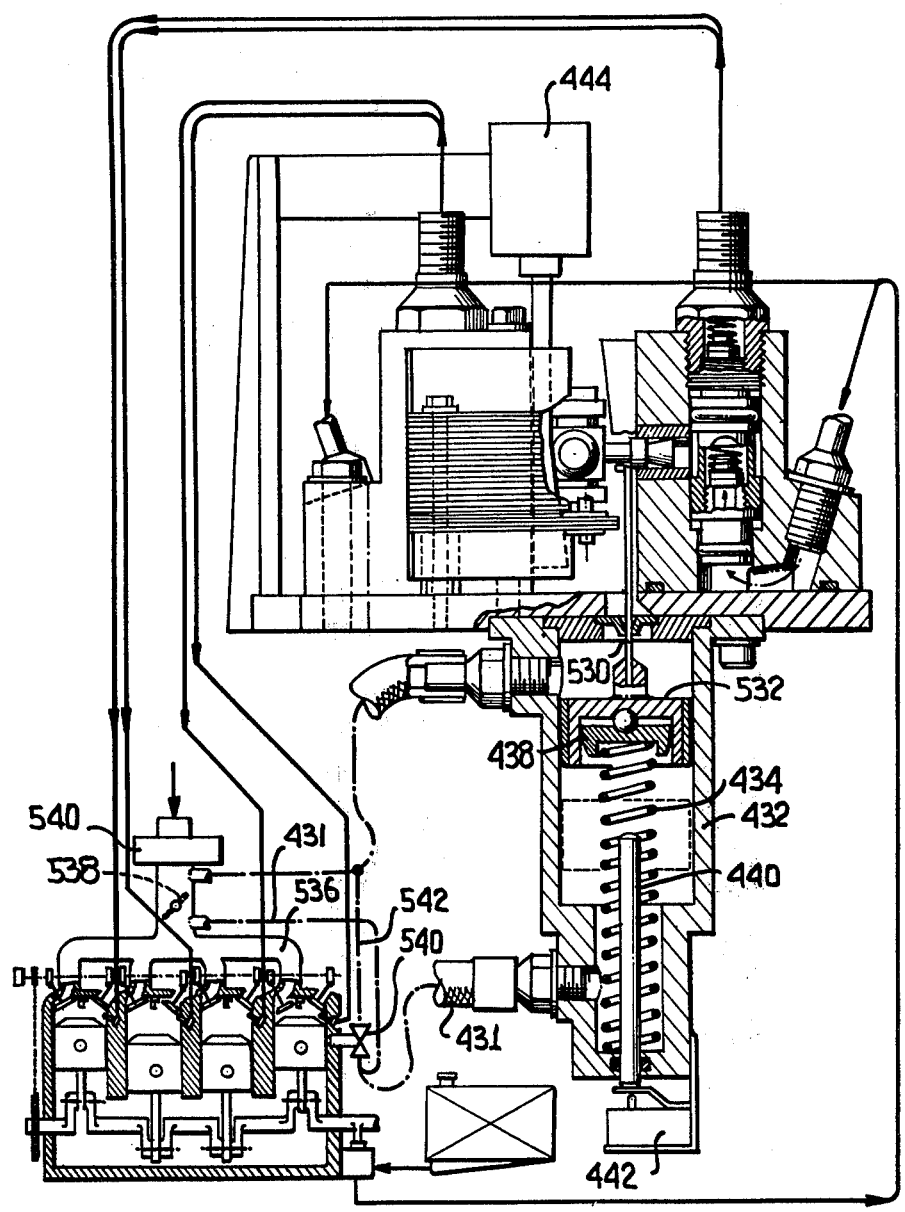
FIG. 13 is a vertical section taken transversely through FIG. 11.
Figure 14:
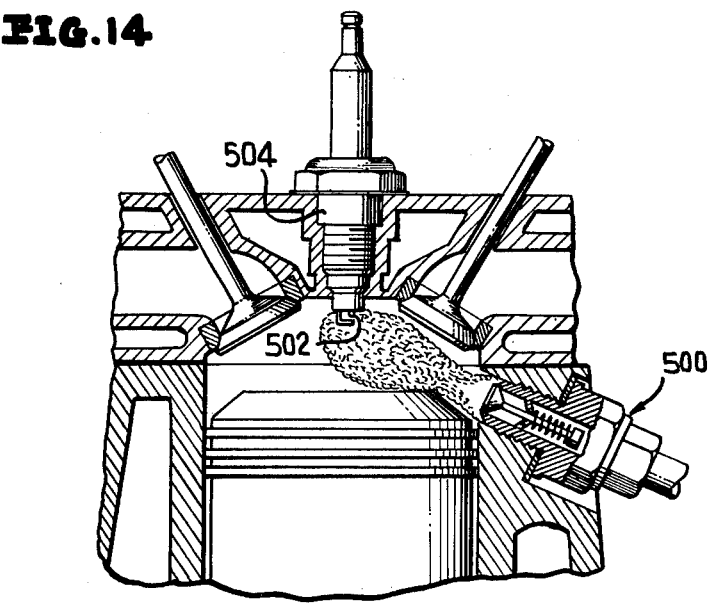
FIG. 14 is a section of an engine illustrating direct fuel injection.

FIGS. 11-13 illustrate a slightly modified arrangement for direct fuel injection as is illustrated in FIG. 14 wherein the injector 500 injects directly into the engine cylinder to direct the well atomized, mist-like spray pattern 502 toward the tip 503 of the spark plug 504. The chief distinction of the pump assembly with respect to those previously described resides in the use of spherical stop elements 370 as shown in FIG. 16 and the stepped configuration for the wedge-like stop means 506 which is actuated in response to manifold pressure variation. The other stop means 508 may be stationary, as before.

Figure 15:
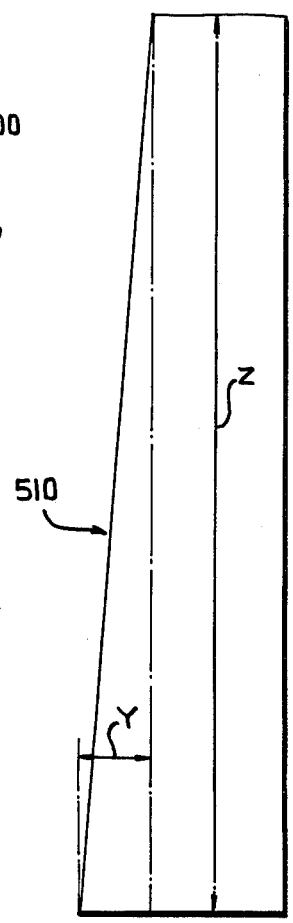
FIG. 15 is a profile view of a stop wedge.

The stepped wedge 506 is employed to accommodate for unbalanced flow characteristics of the conventional intake manifold which may be employed with an engine which has been converted to use the direct fuel injection as illustrated. The end cylinders 1 and 4 which often are somewhat starved as to air flow in comparison with the center cylinders 2 and 3 due to the branching of the inlet manifold from the centrally located carburetor mounting and are fed by those pumps whose armature stops 370 engage the ramp 510 whereas the stops 370 of the armature associated with the center cylinders 2 and 3 engage the ramp 512. As shown in FIG. 15, the slope Y/Z of each ramp 510, 512 is rather gradual and should be less than 1:10 in order to exert relatively little downward force on the stop means 506 when the armature stops strike it. This assures that the wedge will not be moved by the action of the armature assembly striking it. At the same time, with the basic four-pump arrangement, during each revolution of the engine, both armatures will be out of engagement with one or the other of the wedges, thereby allowing the unengaged stop wedge complete freedom of movement under the influence of its associated control means. If one wedge is fixed (i.e. not controlled) whereas the other is for example actuated by an inlet manifold vacuum-operated device, the vacuum-operated device, need exert but little energy accurality to control the associated wedge because of the complete freedom which the wedge periodically experiences. In this way, extremely rapid response time is attained, i.e., within about one engine revolution even at high engine RPM so that injection control is extremely precise at all times and with a minimum of "hunting."

A further feature of the embodiment of FIGS. 11-13 can be seen in FIGS. 13 and 16. It will be noted from these latter Figures that a leaf spring member 530 connects the control piston 532 to the stop means 506. The piston 532 is of cylindrical form so that it runs true in the cylinder 432 and the spring 530 is cantilevered to it as shown. In consequence, the spring 432 serves to hold the stop means 506 against the face 534 of the pump body 344 and in particular to resist rebounding of the stop means in response to being struck by the armature stops. This is of particular interest in high pressure direct fuel injection systems to prevent undue wear, metal fatigue and noise due to the higher value of the forces acting on the armature necessary to achieve the high pressure pumping action.

In FIG. 13, as in the case of indirect fuel injection as well, the intake manifold 536 is provided with a simple air control valve 538 under control of the operator and the air inlet stack may be surmounted with a suitable filter 540. The vacuum control device shown in FIG. 13 provides means for automatically enrichening the fuel-/air mixture when the engine is cold. As shown, the space above the piston 532 is connected to ambient air pressure above the throttle valve 538 whereas the line 431 connects below the throttle valve and thus "sees" the negative pressure in the intake manifold. However, an air bleed to ambient pressure is provided by the thermostatically controlled valve 540 so that, when the engine is cold, the valve 540 is open to allow air to bleed through the conduit or line 542 thus to increase the pressure acting below the piston 532. Thus, the stop means 506 is positioned under the action of the spring 434 to achieve a richer than normal mixture. When the engine warms up, the valve 540 is closed.

A futher feature of the FIGS. 11-13 embodiment is the use of armatures which are tapered to increase their thickness from their fulcrumed ends to their free swinging ends. This feature prevents saturation of that portion of an armature in the region of its coupling to the piston assembly because there is more iron in the armature at its free end.

As noted before, the timing of the injections may be varied by controlling the distributor 248 by techniques conventionally employed to vary the timing of an ignition distributor. The timing of direct injection alters the emission characteristics of the engine exhaust gases and the direct injection timing in general may be varied within the range of about 150° to 10° before top dead center, dependent upon the engine speed, engine temperature and engine load. The particular objective is to minimize the CO content of the exhaust gas and the injection timing curve will of course vary for different types of engines but as a rule of thumb an injection timing of about 30° before TDC under engine conditions requiring ignition at about 10° before TDC can be considered as normal.

Figure 19:
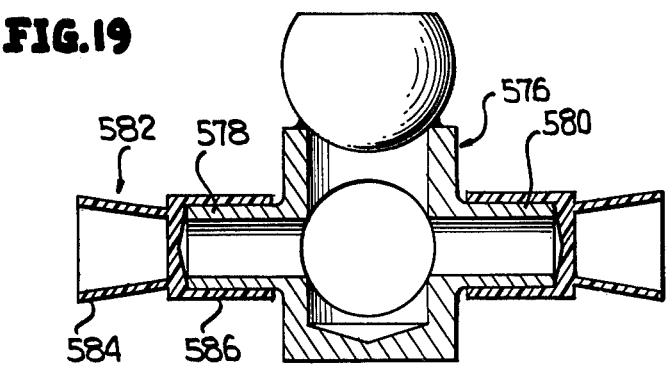
FIG. 19 is an enlarged section showing a portion of FIG. 18.

FIGS. 18 and 19 illustrate certain preferred features of the invention. In FIG. 18, the support 550 for the pump bodies 552 and 554 and and for the electromagnet pairs 556, 558 and 560, 562 also supports the armature fulcrum members 564 and 566, each having a semicircular slot receiving an elastomeric fulcrum block 568 or 570 each of which is of generally C-shaped configuration as shown. The ends of the armatures 572 and 574 are simply slip-fitted within these elastic blocks so that although the proper fulcrum is supplied, each armature is free to position itself so as to avoid interference with the reciprocations with the pump pistons driven by it. A preferred piston assembly construction is shown in FIG. 19 wherein the cross piece 576 is constructed as illustrated with the opposite side extensions 578 and 580. Each piston 582 includes the cup shaped end portion 584 and the guide collar portion 586 which is slip-fitted over and adhesively secured to its associated leg 578 or 580.

Figure 21:
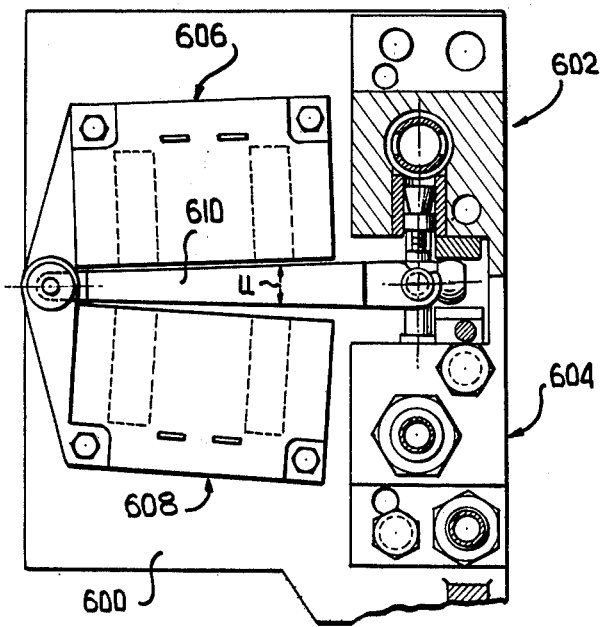
FIG. 21 illustrates a basic two pump unit.
Figure 20:
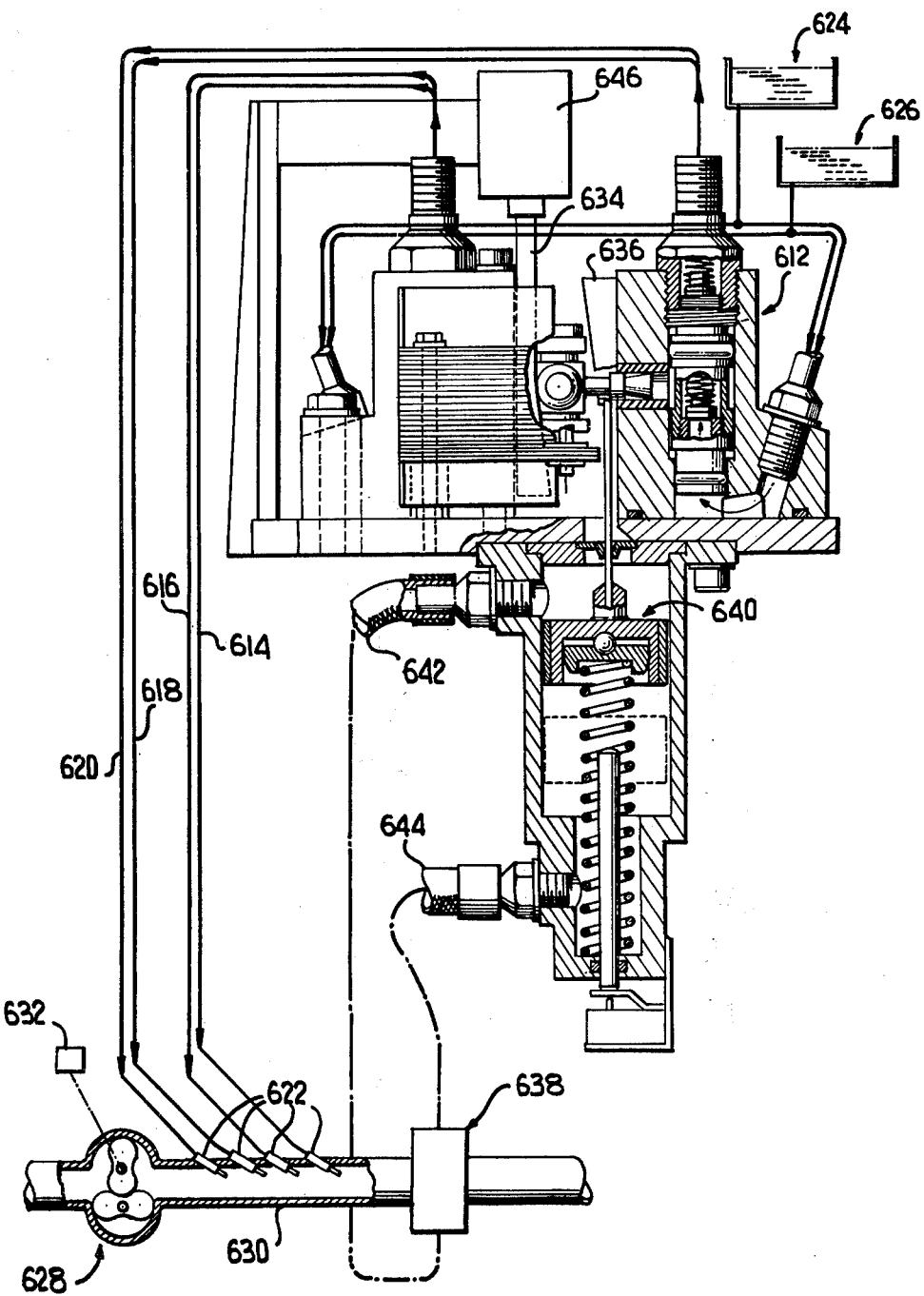
FIG. 20 illustrates a further embodiment.
Figure 22:
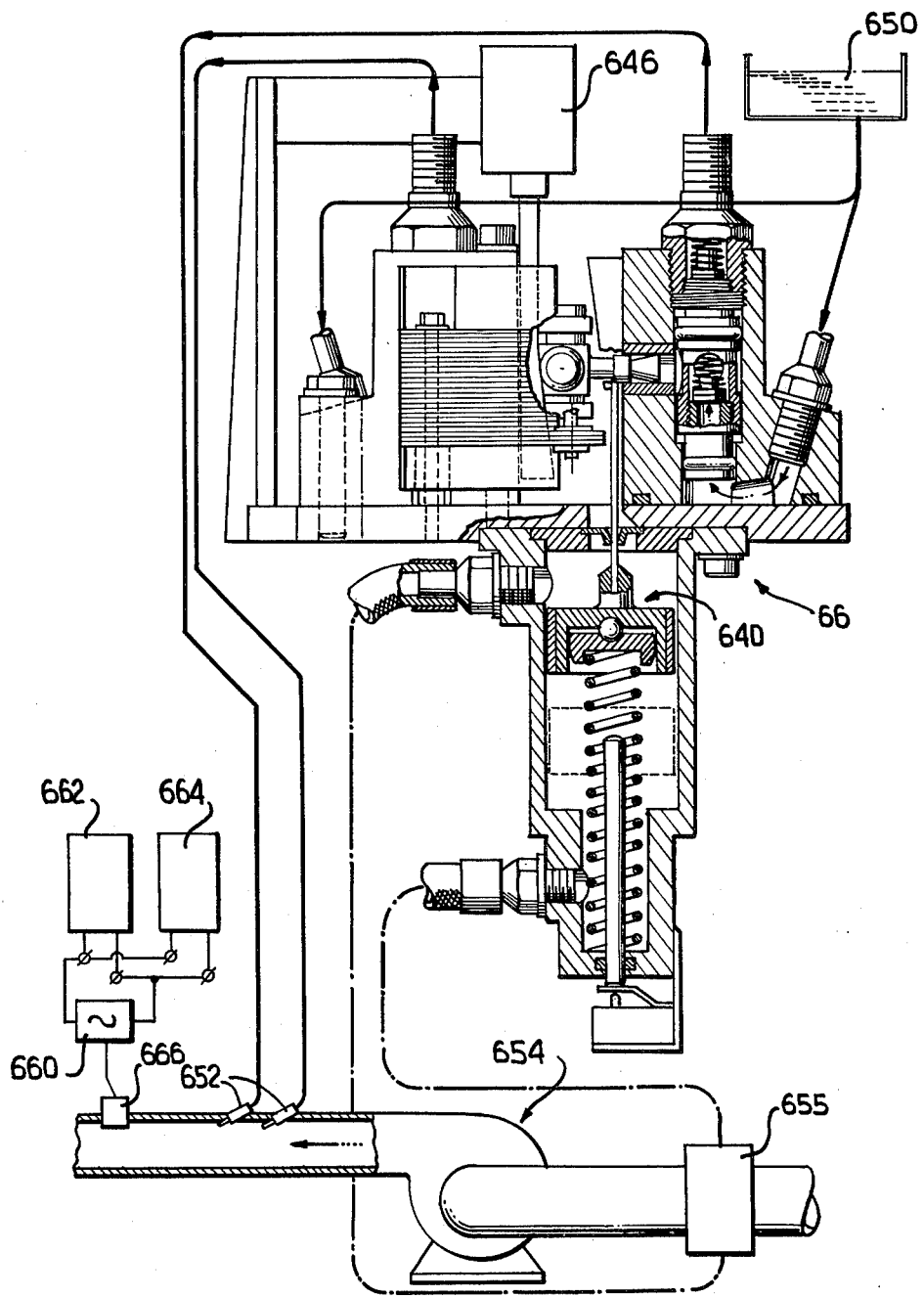
FIGS. 22 and 23 illustrate still further embodiments.
Figure 23:
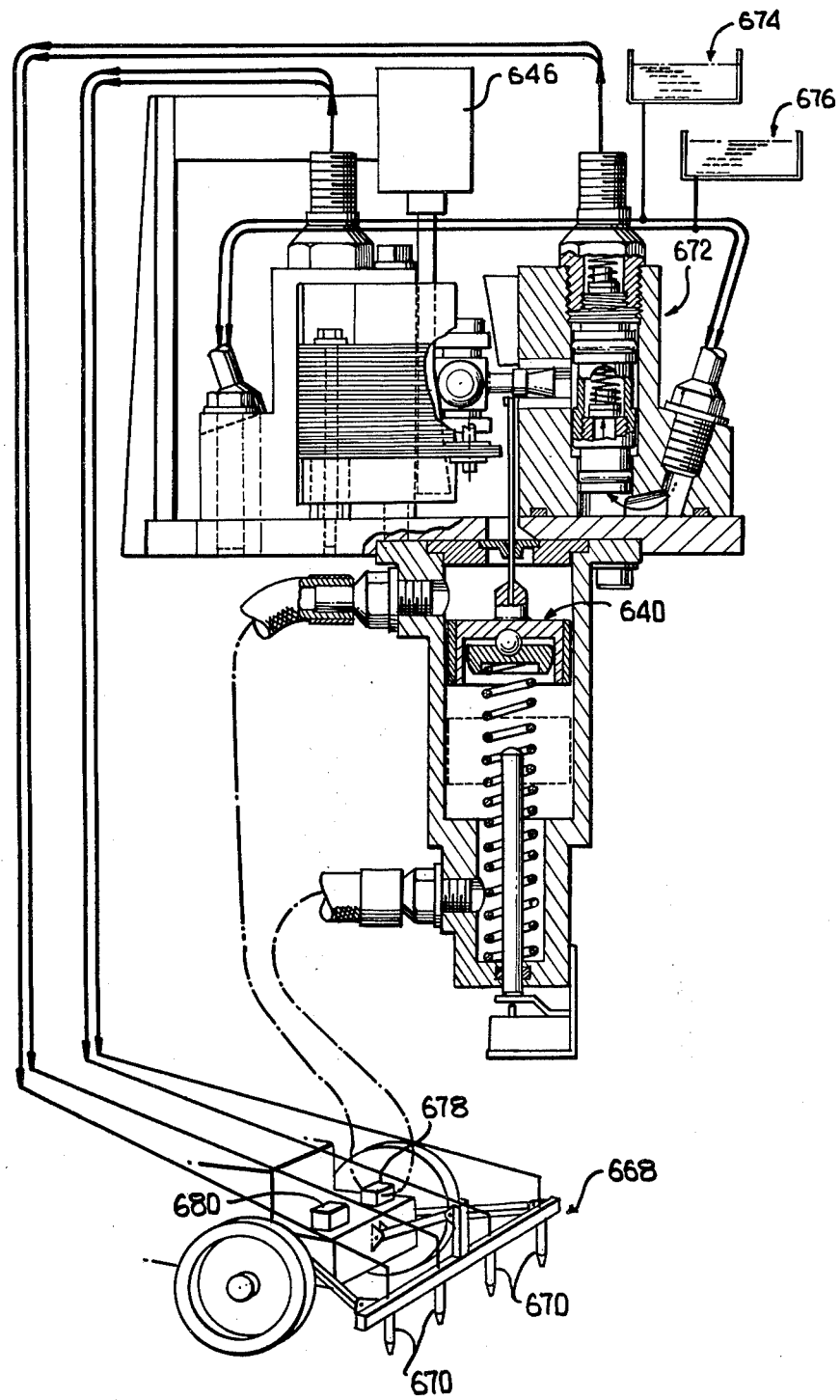

FIGS. 20–23 illustrate several embodiments of a pump system wherein advantage is taken of the three potential control points for varying the volumetric flow. In FIG. 21 a basic pump unit is shown, comprising the common support 600 for the two pump bodies 602 and 604 which in fact may be joined together as shown, the two electromagnets 606 and 608, and the armature 610. The application of such a pump to systems for controllably admixing or delivering fluid is illustrated in FIGS. 20, 22 and 23.

In FIG. 20, the pump assembly 612 comprises a four-pump unit providing the four discharge lines 614, 616, 618 and 620 and corresponding injectors 622. One pair of pumps is fed from a supply 624 of one liquid whereas the other pair is fed from a supply 626 which may be a different liquid. The positive displacement pump 628 causes a controlled flow rate of main liquid through the conduit 630 and is provided with a variable speed drive means 632. To provide coarse control of metering the desired amounts of the two liquids 624 and 626, the electromagnets may be energized sequentially at a frequency proportional to the speed imparted by the drive means 632, fine adjustments being effected by the stop wedges 634 and 636. Downstream of the injection region there is provided a sensor/actuator 638 which measures the proportions of the liquids 624 and 626 in the main liquid and regulates the pressure differential across the piston 640, by means of the lines 642 and 644, to maintain the desired mixture proportions. A further fine control is effected by means of a solenoid 646 connected to the wedge 634. For example, a manually controlled rheostat may be provided to control the solenoid 646, or a further sensor/actuator could be employed as, for example, a further device 638 located at another downstream location. Alternatively, the control 646 may be used in conjunction with a dual ramp wedge 636 to vary the relative proportions of the two liquids 624 and 626 being injected, the simplest case being a wedge 636 having two ramps of different slopes, one which engages the ball of one armature and the other of which engages the ball of the other armature.

In FIG. 22, a two pump assembly as in FIG. 21 receives a single liquid supply 650 and discharges to a pair of injectors 652. The main fluid is displaced by the pump 654 and upstream of this pump there is provided a main fluid flow measuring device 655 which controls the piston 640 as in FIG. 20. However, in FIG. 22 the overall control is somewhat different in that the frequency of energization of the two electromagnets is controlled by a pulse generator 660 alternately pulsing the two multivibrator circuits 662 and 664 for the electromagnets at a frequency controlled by the mixture sensor/actuator 666. Manual or other control may be effected by the solenoid 646.

In FIG. 23, an agricultural fertilizer applicator 668 is illustrated, having subterranean injector nozzles 670 individually fed by the pump of a four-pump assembly 672. The liquid supplies 674 and 676 may be the same or different. The piston 640 is controlled by the vehicle speed sensor 678 and a vehicle speed-controlled pulse generator 680 may be employed to energize the electromagnets. Fine control and/or differential control if two different liquids 674 and 676 are employed, may be effected by controlling the solenoid 646 manually or otherwise.

FIGS. 20, 22 and 23 illustrate but a few of the kinds of systems which may be employed. Each has the advantage that the quantity of liquid delivered per stroke is very small with at least one and, if desired, two controls being employed to regulate this fineness. The energization frequency on the other hand allows a very wide range of volumetric flow rate. The result overall is a system which allows for extremely precise control of the liquid or liquids delivered.

FIG. 8 illustrates a preferred embodiment of multivibrator circuit. As shown, a source of positive voltage is applied to the conductor 700 whereas a negative-going signal from an associated pick-up coil is applied to the conductor 702. Normally, the voltage level at the base of the transistor 704 as established by the resistor chain 706, 708, 710, 712 is such as causes this transistor to conduct. This input signal, applied through the resistor 714 turns the transistor 704 off, allowing trnasistor 716 to turn on for a time determined the RC circuit 718,720. The voltage divider 706,708 turns on the transistor 722 as soon as the transistor 716 conducts, in turn raising the base voltage level of the transistor 724 through the resistor 726 causing the transistor 724 to conduct. This latter transistor is in circuit with the electromagnet winding W of the associated electromagnet. It has been found that the pump assembly is capable of higher speed operation (i.e., tolerates more overlap in energizing pulses of electromagnet pairs) if the windings W of each pair are wound such that, when energized, the opposed frame portions are of opposite polarity. Thus, in FIG. 22 for example, the three legs of the frame 556 would be energized to be North, South, North while those of the frame 558 would be energized to be South, North, South.

What is claimed is:

1. An injector system for delivering fuel to a combustion engine, comprising in combination:
   a pair of fuel pumps and connecting means for maintaining said pumps in spaced, fixed relation to each other, said pumps presenting mutually opposed and aligned bores;
   a double-ended piston assembly having displacer bodies at its opposite ends received respectively in said bores and a coupling member connecting said displacer bodies, said bores having inlet means and outlet means for inducting and discharging fuel in response to reciprocation of said piston assembly;
   means operating in the space between said pumps for reciprocating said piston assembly; and
   control means for controlling the stroke of said piston assembly, said control means comprising a pair of stop members disposed in the path of said piston assembly and delineating the stroke thereof, at least one of said stop members being movable to vary said stroke.

2. An injector system as defined in claim 1 wherein said pumps present mutually opposed and parallel faces, said stop members being engaged against respective ones of said faces.

3. An injector system as defined in claim 2 wherein said one stop member is in the form of a wedge.

4. An injector system as defined in claim 1 wherein said one step member is in the form of a wedge.

5. An injector system as defined in claim 3 including spring means for maintaining said one stop member engaged against its corresponding face of a pump.

6. An injector system as defined in claim 5 wherein said control means includes a control member connected to said spring means.

7. An injector system as defined in claim 4 including spring means for maintaining said one stop member engaged against its corresponding face of a pump.

8. An injector system as defined in claim 7 wherein said control means includes a control member connected to said spring means.

9. An injector assembly as defined in claim 3 wherein said wedge has an inclination which is less than 1:10.

10. An injector assembly as defined in claim 3 wherein said wedge has an inclination which is in the order of magnitude of 1:14.

11. An injector assembly as defined in claim 4 wherein said wedge has an inclination which is less than 1:10.

12. An injector assembly as defined in claim 11 wherein said wedge has an inclination which is in the order of magnitude of 1:14.

13. An injector system as defined in claim 1 wherein said means for reciprocating said piston assembly comprises an armature pivotally mounted at one end and having an opposite, free end connected to said piston assembly and a pair of electromagnets disposed on opposite sides of said armature, said armature having more iron at said free end that at said one end thereof in order to avoid magnetic saturation.

14. An injector as claimed in claim 1, characterized in that said coupling member is provided with two arms to which said displacer bodies are secured and with a third arm which is adapted to cooperate with the control means.

15. An injector as claimed in claim 1 wherein said means for reciprocating the piston assembly comprises an armature connected with said piston assembly and a pair of electromagnets disposed on opposite sides of said armature, said coupling member having a fourth arm provided with guide surfaces adapted to cooperate with the armature.

16. An injector as claimed in claim 1 wherein each pump includes a housing, the pump housing presenting facing surfaces arranged opposite and accurately parallel to one another and said stop members engaging respective ones of said surfaces.

17. An injector as claimed in claim 16, characterized in that the facing surfaces are ground to flatness.

18. A pump assembly comprising, in combination:
   a body defining a pump chamber and a movable displacer body associated with said chamber for free displacements thereof to induct liquid into said chamber and discharge liquid from said chamber;
   means for moving said displacer body;
   a coupling member connected to said displacer body and including an abutment member in the form of at least part of a hardened ball; and
   stop means for intercepting said abutment member for variably controlling the movement of said displacer body, said stop means comprising at least one movable stop member having a flat surface engaging a convex surface of said ball, and control means for moving said movable stop member.

19. A pump assembly as claimed in claim 18 wherein said ball is welded or soldered to said coupling member.

20. A pump assembly as claimed in claim 19 characterized in that said coupling member includes a bore within which the ball is welded or soldered.

21. A pump assembly as claim in claim 18 characterized in that the adjustable stop is wedge-shaped.

22. A pump assembly comprising, in combination:
   a support having a pair of spaced cylinder blocks on one side thereof, said cylinder blocks presenting mutually opposed an substantially aligned bores;
   a double-ended piston assembly having opposite ends received in said bores and said bores having inlet means and outlet means for inducting and discharging liquid in response to reciprocation of said piston assembly;
   a pair of electromagnets on said one side of the support adjacent to and generally aligned with said cylinder blocks;
   an armature disposed between said electromagnets and projecting into the space between said cylinder blocks;
   means connecting said armature to said piston assembly;
   multivibrator means for alternately energizing said electromagnets;
   stop means for delineating the stroke of said piston assembly, said stop means including at least one wedge-shaped stop axially shiftable in direction normal to said one side of the support and projecting therethrough; and
   control means on the other side of said support and connected to said wedge-shaped stop for axially shifting same.

23. A fuel injector pump comprising, in combination:
   a support;
   a pair of cylinder block assemblies on said support and disposed in spaced, opposed relation to each other, each cylinder block assembly having at least one cylinder bore therein in which such bores are aligned axially and open toward each other;
   a piston assembly received in free-floating relation within said cylinder bores, said piston assembly including a member bridging between said cylinder block assemblies, a pair of pistons fixed to the opposite ends of said member, and an abutment on said member;

a pair of electromagnets fixed to said support and disposed in spaced relation to each other defining a corridor leading toward the space between said cylinder block assemblies;

a plate-like armature having opposite side faces facing respective ones of said electromagnets;

means connecting one end of said armature to said member;

pivot means pivotally connecting the opposite end of said armature to said support;

a pair of stop means disposed on opposite sides of said abutment between said cylinder block assemblies for allowing said armature freely to flap back and forth between but without engaging said electromagnets whereby to reciprocate said pistons within their bores, at least one of said stop means being adjustable for varying the stroke of said piston assembly energizing means for alternately energizing said electromagnets whereby to effect the free-floating flapping of said armature, said energizing means being effective to energize the respective electromagnets for time durations sufficient to engage said abutment against the respective stop means before the end of each time duration; and inlet and outlet means associated with each cylinder bore for supplying fuel to and educting fuel from each such cylinder bore.

24. A fuel injector pump according to claim 23 wherein said one stop means is in the form of a wedge.

25. A pump assembly comprising, in combination:
a cylinder block having at least one cylinder bore therein;

a piston slidably received in said bore in free-floating relation therein;

electromagnetic drive means for shuttling said piston back and forth in said bore and including an energizing circuit having pulse generator means producing output pulses of time durations sufficient to energize said electromagnetic drive means and create back and forth movements of said piston;

stop means for arresting the movements of said piston during said back and forth movements thereof whereby said piston continues to receive motive force from said electromagnet means momentarily in each of its end-of-stroke positions, said stop means comprising a pair of wedge members;

means for axially shifting said wedge members to vary the stroke of said piston;

means for delivering liquid to said cylinder and for educting liquid therefrom displaced by said piston; and means for varying the frequency of occurrence of output pulses from said pulse generator means whereby the volumetric output of said pump assembly is independently controllable by said stop means and by said means for varying.

26. A pump assembly as defined in claim 25 wherein said means for controlling independently controls said wedge members whereby three separate and independent controls for varying the volumetric output are available.

27. A pump assembly comprising, in combination:

a body defining a pump chamber and movable liquid displacement means associated with said chamber for free displacements thereof to induct liquid into said chamber and discharge liquid from said chamber;

electromagnetic drive means associated with said movable means for effecting said displacements of said movable means and including pulse generator means for producing output pulses energizing said electromagnetic drive means at discrete time periods sufficient to effect inducting and discharging displacements of said movable means;

first and second stop means for arresting said movable means during said displacements thereof whereby said movable means is arrested during each of its displacements;

means for delivering liquid to and conveying it from said chamber;

means for varying the frequency of occurrence of said output pulses from said pulse generator means; and means for adjusting at least one of said stop means to vary said displacements of the movable means, said one stop means being in the form of a wedge and being adjusted axially thereof.

28. In a pump system, the combination of:
a cylinder member having a pump chamber therein;
inlet means for admitting fluid into said chamber;
outlet means for allowing fluid to flow from said chamber;
a piston member reciprocable in said chamber;
an armature connected to said piston member;
a pair of stop means for acting on said armature and piston member to delineate the stroke of said piston member;

drive means for causing said piston member to reciprocate back and forth through its stroke, said drive means including at least one electromagnet acting on said armature to move said piston member within said chamber to discharge fluid therefrom and means for energizing said electromagnet to move said armature during discrete time periods whereby one of said stop means reacts against force exerted by said electromagnet only intermittently and is free from such reaction during time intervals between said discrete time periods; and control means for varying the stroke of said piston member, said control means comprising mechanism for moving said one stop means whereby said mechanism requires little energy input because of the absence of said reaction during said time intervals, said one stop means being in the form of a wedge and being axially shiftable to vary the stroke of said piston member.

29. A fuel injector pump comprising, in combination:
a support;
a pair of cylinder block assemblies on said support and disposed in spaced, opposed relation to each other, each cylinder block assembly having at least one cylinder bore therein in which such bores are aligned axially and open toward each other;

a piston assembly received in free-floating relation within said cylinder bores, said piston assembly including a member bridging between said cylinder block assemblies, a pair of pistons fixed to the opposite ends of said member, and abutment means on said member;

a pair of electromagnets fixed to said support and disposed in spaced relation to each other defining a corridor leading toward the space between said cylinder block assemblies;

a plate-like armature having opposite side faces facing respective ones of said electromagnets;

means connecting one end of said armature to said member;

pivot means pivotally connecting the opposite end of said armature to said support;

a pair of stop means disposed in the path of said abutment means for allowing said armature freely to flap back and forth between but without engaging said electromagnets whereby to reciprocate said pistons within their bores, at least one of said stop means being adjustable for varying the stroke of said piston assembly;

energizing means for alternately energizing said electromagnets whereby to effect the free-floating flapping of said armature; and inlet and outlet means associated with each cylinder bore for supplying fuel to and educting fuel from each such cylinder bore.

30. A fuel injector pump according to claim 29 wherein said one step means is in the form of a wedge.

31. A fuel injection assembly for providing substantially identical fuel injection quantities to different cylinders of an internal combustion engine, comprising in combination:

a pair of pump bodies and mounting means for maintaining said bodies in spaced, fixed relation to each other, each body having a bore with the bores of the two bodies being aligned and mutually facing;

a common piston assembly for said bores comprising an elongate assembly bridging between said bodies and having its opposite ends received in the respective bores, each bore including inlet means and outlet means for inducting and discharging fuel in response to reciprocation of said piston assembly;

common stop means located between said bodies for intercepting said common piston assembly to delineate the stroke thereof whereby to establish substantially the same fuel injection quantity from each pump for any fixed stroke of said piston assembly;

control means for changing the position of said stop means with respect to said piston assembly whereby to change the stroke of said common piston assembly and thereby increase or decrease the amount of fuel injected by each pump by the same amount; and drive means for reciprocating said piston assembly.

32. A quadruple pump unit for injecting fuel to different cylinders of an internal combustion engine while insuring essentially identical fuel injection quantities from each pair of the four pumps, comprising in combination:

first and second pump bodies and mounting means for maintaining said bodies in spaced, fixed relation to each other, said bodies presenting two pairs of mutually opposed and aligned bores, each bore having inlet means and outlet means associated therewith for inducting and discharging fuel;

first and second common piston assemblies, said first assembly bridging between said bodies and having its opposite ends received in respective ones of one pair of bores and said second assembly bridging between said bodies and having its opposite ends received in respective ones of the other pair of bores;

first drive means connected to said first assembly between said bodies for reciprocating said first assembly correspondingly to discharge fuel from one of said one pair of bores while inducting a similar quantity of fuel into the other bore of said one pairs of bores, and vice versa, and second drive means connected to said second assembly between said bodies for reciprocating said second assembly correspondingly to discharge fuel from one of said other pair of bores while inducting a similar quantity of fuel into the other bore of said other pair of bores, and vice versa;

each piston assembly including abutment means;

common stop means disposed between said bodies in the paths of said abutment means for delineating the stroke of each piston assembly; and control means connected to said common stop means for moving same to alter the strokes of said first and second piston assemblies simultaneously.

33. A quadruple injection pump unit for delivering fuel to different cylinders of an internal combustion engine, comprising in combination:

a pump assembly having two pairs of mutually facing and aligned bores and defining a common space between the bores of said pairs;

a first piston assembly bridging said space and having its opposite ends received respectively in the bores of one pair thereof, and a second piston assembly bridging said space and having its opposite ends received respectively in the bores of the other pair thereof;

inlet means associated with each bore and outlet means associated with each bore for respectively inducting fuel and discharging fuel in response to reciprocation of said piston assemblies;

first drive means for reciprocating said first piston assembly and second drive means for reciprocating said second piston assembly, said drive means actuating said piston assemblies in sequential fashion to supply fuel at different times, each drive means including a member projecting into said space and coupled with a corresponding piston assembly; and a pair of stop means also located in said space and disposed in the paths of said members of said first and second drive means for variably delineating the strokes of said piston assemblies, said stop means including at least one movable member common to both of said piston assemblies for simultaneously varying the strokes thereof.

34. An injection pump unit as defined in claim 33 wherein the space defined by said unit is bounded in part by a flat surface between said pairs of bores and normal to the axes of said bores, said one movable member being in the form of a wedge and engaging said flat surface.

35. An injection pump unit as defined in claim 34 wherein said space is defined in part by a further flat surface in mutual opposition and parallel to the first mentioned flat surface, said stop means including a further member engaging said further flat surface.

36. An injection pump unit as defined in claim 35 wherein said further member is movable and is in the form of a wedge.

37. An injection pump unit for delivering fuel to different cylinders of an internal combustion engine, comprising in combination:

a pump assembly having a pair of mutually opposed and aligned bores and defining a common space between such bores;

a piston assembly bridging said space and having its opposite ends received respectively in said bores; inlet means associated with each bore and outlet means associated with each bore for respectively inducting fuel and discharging fuel in response to reciprocation of said piston assembly;

drive means for reciprocating said piston assembly and including a member projecting into said space and coupled with said piston assembly; and a pair of stop means also located in said space and disposed in the paths of said member of said drive means for variably delineating the stroke of said piston assembly, said stop means including at least one movable member for identically varying the delivery stroke of each pump.

38. An injection pump unit as defined in claim 37 wherein said space is defined in part by a flat surface adjacent one of said bores and normal to the axes thereof, said one movable member being in the form of a wedge engaging said flat surface.

39. An injection pump unit as defined in claim 38 wherein said space is defined in part by a further flat surface parallel and opposed to the first mentioned surface, said stop means including a further member engaging said further flat surface.

40. An injection pump unit as defined in claim 39 wherein said further member is movable and is in the form of a wedge.

41. In a fuel injection system for internal combustion engines, the combination of:

a cylinder member having a pump chamber therein;

inlet means for allowing one way flow of fuel into said chamber;

means for supplying fuel under pressure to said inlet means;

outlet means for allowing one way flow of fuel from said chamber;

a piston member reciprocable in said chamber;

drive means for causing said piston member to reciprocate back and forth within said chamber alternately to induct and discharge fuel respectively through said inlet means and said outlet means, said drive means including an elongate, plate-like armature pivoted at one end and directly engaging said piston member at its opposite end, an electromagnet having spaced pole faces disposed in spaced, opposed relation to one side face of said armature between said ends thereof such that, upon energization of said electromagnet, the armature is attracted theretoward to move said piston member in fuel-discharging direction, first stop means for allowing said side face of the armature closely to approach said pole faces, but without touching them, and for abruptly terminating armature motion whereby to transmit a magnetic driving force directly from said armature to said piston member which increases progressively throughout said movement of the piston member in said fuel-discharging direction, second stop means for allowing said one face of the armature to move a limited distance away from said pole faces and for then abruptly terminating fuel-inducting movement of said piston member whereby said first and second stop means delineate the stroke of said piston member, pulse generating means for energizing said electromagnet with an electric pulse and for maintaining said pulse for a duration substantially just sufficient to complete the fuel-discharging stroke of the piston member whereby said armature is abruptly arrested by said first stop means in its fuel-discharging movement while the magnetic force acting on the piston member is increasing;

first control means for repetitively triggering said pulse generating means in frequency controlled, time-separated fashion whereby to produce a controlled and variable time-separated sequence of said pulses in which each pulse is sufficiently time separated with respect to pulses preceding and succeeding it as to allow for fuel-induction movement of said piston member prior to fuel-discharge movement thereof; and second control means for moving one of said stop means to vary the stroke of said piston member.

42. In a fuel injection system as defined in claim 41 including third control means for moving the other of said stop means to vary the stroke of said piston member.

* * * * *